(12) United States Patent
Yanagisawa

(10) Patent No.: US 8,125,554 B2
(45) Date of Patent: Feb. 28, 2012

(54) VIEWFINDER, AND CONTROL METHOD AND IMAGING APPARATUS THEREOF

(75) Inventor: Hiroshi Yanagisawa, Kanagawa (JP)

(73) Assignee: Sony Corporation (JP)

( * ) Notice: Subject to any disclaimer, the term of this patent is extended or adjusted under 35 U.S.C. 154(b) by 388 days.

(21) Appl. No.: 12/070,262

(22) Filed: Feb. 14, 2008

(65) Prior Publication Data

US 2008/0198253 A1 Aug. 21, 2008

(30) Foreign Application Priority Data

Feb. 16, 2007 (JP) ................. P2007-035886

(51) Int. Cl.
H04N 5/222 (2006.01)

(52) U.S. Cl. ......... 348/333.01; 348/333.02; 348/333.03; 348/333.04; 348/333.05; 348/333.06; 348/333.07

(58) Field of Classification Search ......... D16/200–220, D16/237–250
See application file for complete search history.

(56) References Cited

U.S. PATENT DOCUMENTS

| 4,550,343 | A | | 10/1985 | Nakatani |
| 5,760,760 | A | * | 6/1998 | Helms ........................... 345/102 |
| 6,618,042 | B1 | * | 9/2003 | Powell ........................... 345/204 |
| 2004/0160523 | A1 | * | 8/2004 | Mogi et al. ............... 348/333.07 |
| 2006/0227235 | A1 | * | 10/2006 | Miura ....................... 348/333.01 |
| 2007/0229694 | A1 | | 10/2007 | Oshima et al. |

FOREIGN PATENT DOCUMENTS

| JP | 60-019269 | U | | 1/1985 |
| JP | 5-292362 | A | | 11/1993 |
| JP | 9-102894 | A | | 4/1997 |
| JP | 10-322575 | A | | 12/1998 |
| JP | 2001352466 | A | * | 12/2001 |
| JP | 2004-147232 | A | | 5/2004 |
| JP | 2005-210677 | A | | 8/2005 |
| WO | 2005034509 | A1 | | 4/2005 |

OTHER PUBLICATIONS

Japanese Office Action issued in corresponding Japanese Patent Appln. No. 2007-035886 on Dec. 26, 2008.
Office Action from Correspondence Chinese Application No. 2008-10009307.2, dated Aug. 14, 2009.

* cited by examiner

*Primary Examiner* — Jason Chan
*Assistant Examiner* — Yih-Sien Kao
(74) *Attorney, Agent, or Firm* — Lerner, David, Littenberg, Krumholz & Mentlik, LLP

(57) ABSTRACT

A viewfinder according to an embodiment of the present invention includes: a display unit including a display surface on which a picture is displayed based on a picture signal supplied from an imaging apparatus; and an eyepiece unit, which is detachably attached to the display unit, configured to enlarge a picture displayed on the display surface to make the picture visually recognizable; wherein the display unit includes the display surface, a display control unit configured to display the picture on the display surface based on the picture signal, and a detecting unit configured to detect the presence/absence of attachment of the eyepiece unit; and wherein the display control unit is configured so as to laterally invert a picture to be displayed on the display surface based on the detection of the detecting unit, and also so as to change the brightness of a picture to be displayed on the display surface.

9 Claims, 22 Drawing Sheets

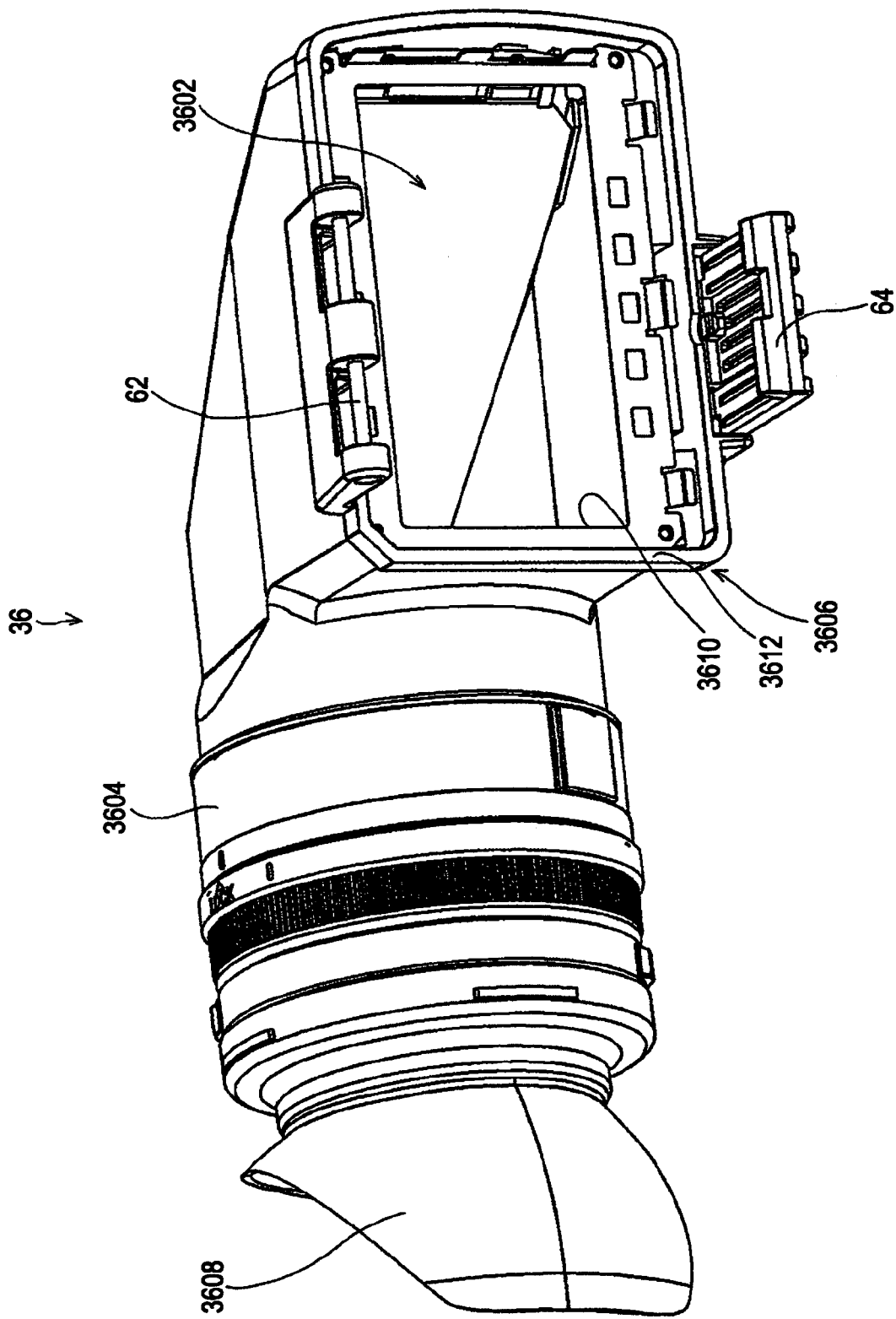

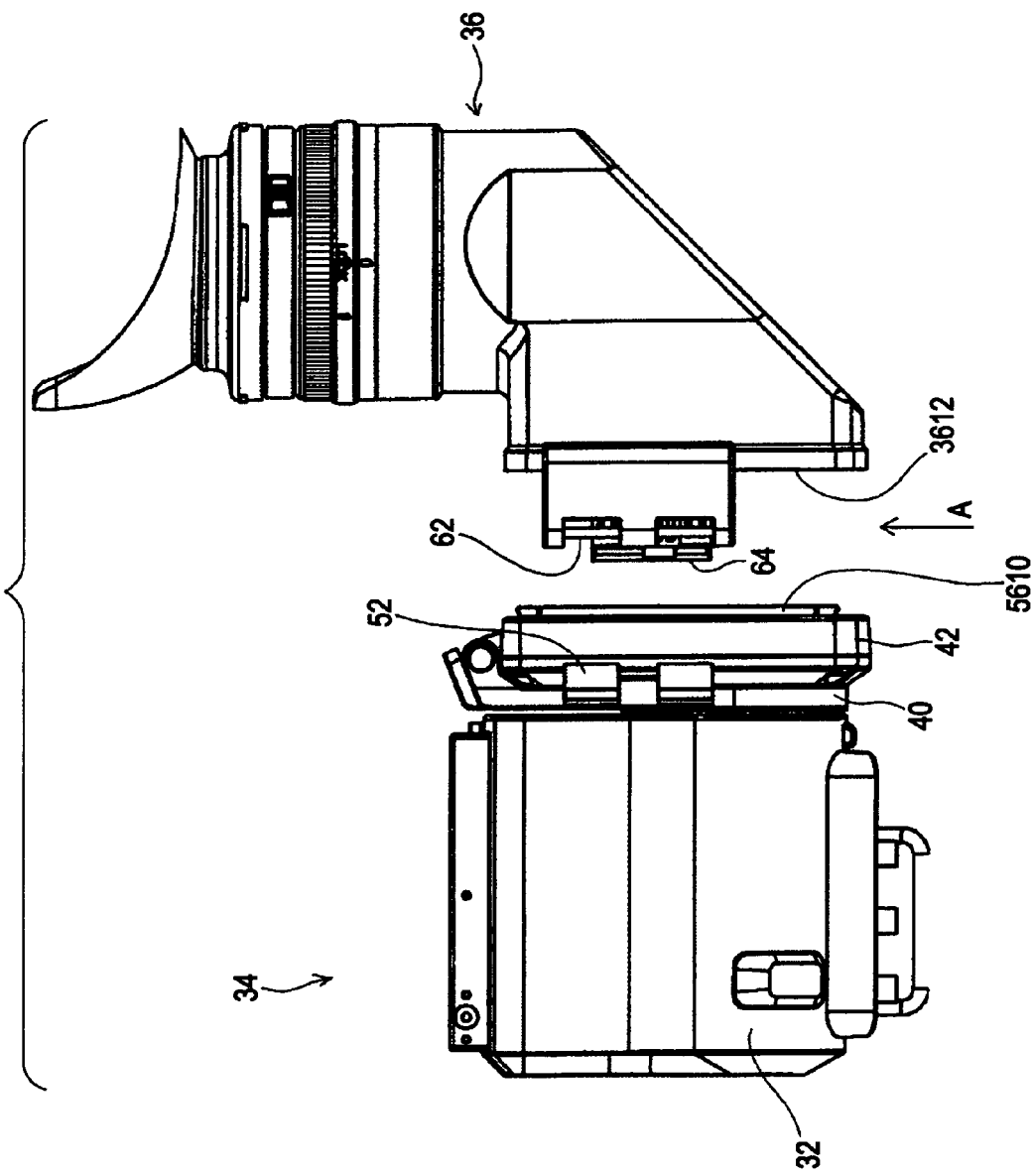

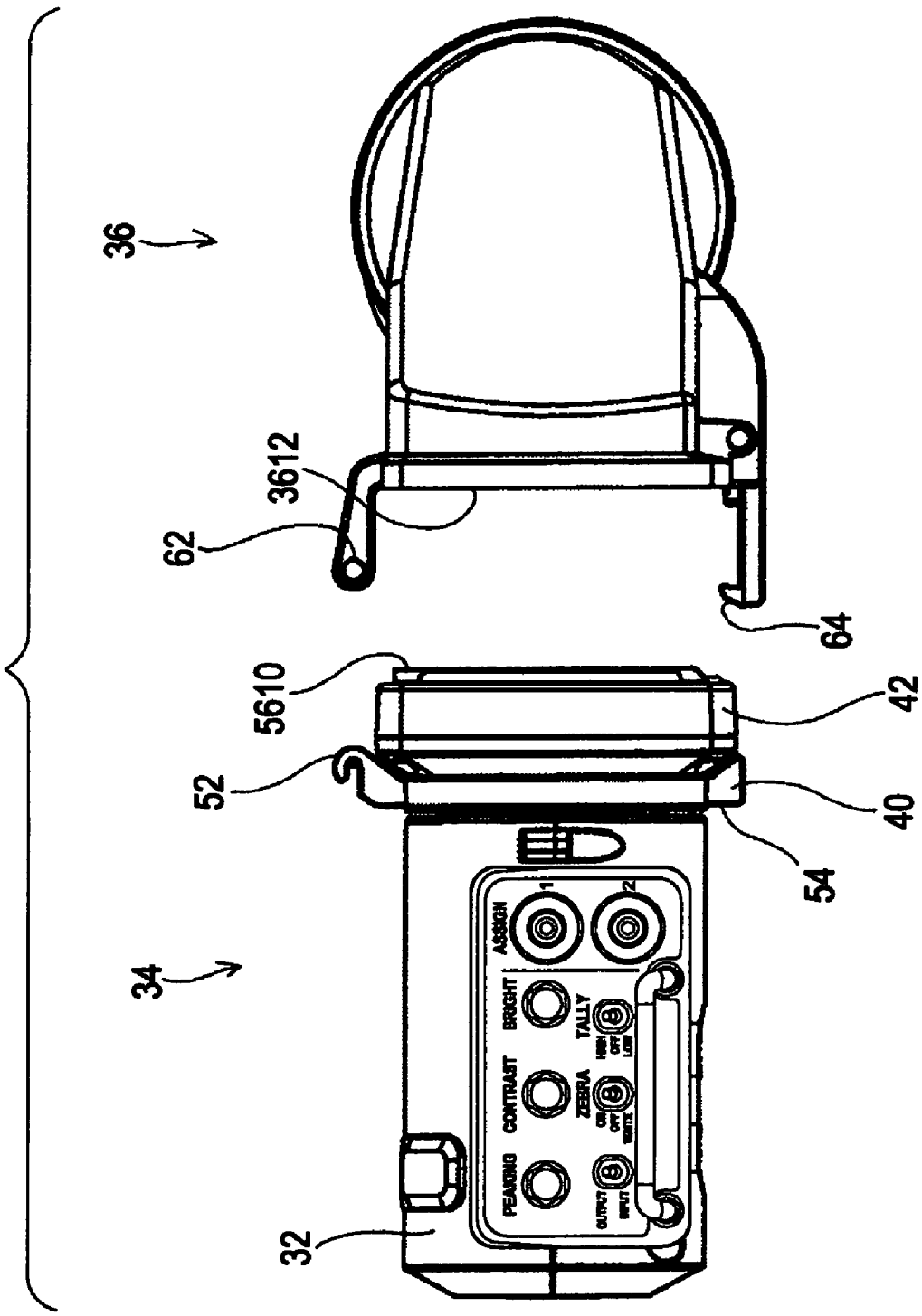

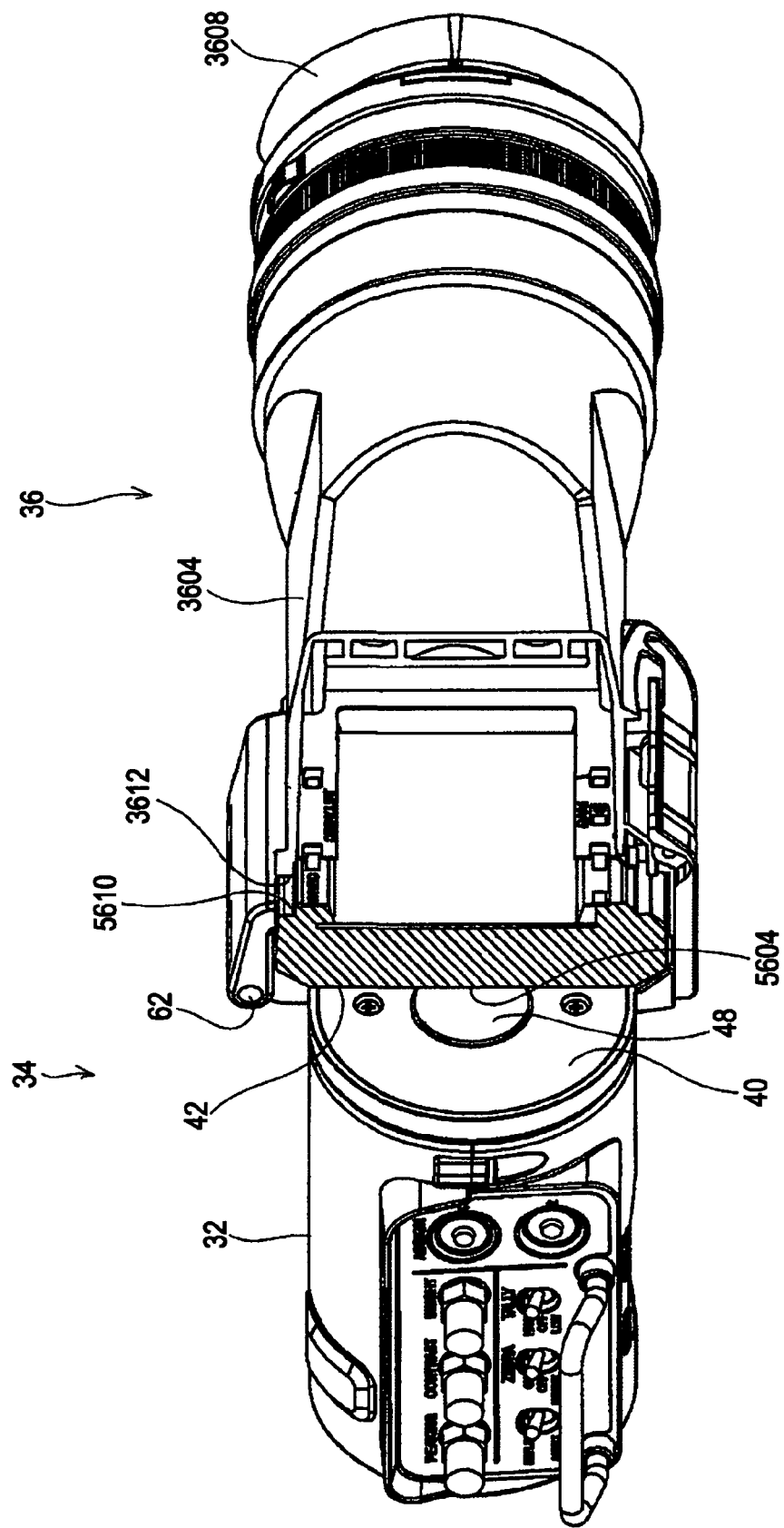

VIEWFINDER, AND CONTROL METHOD AND IMAGING APPARATUS THEREOF

CROSS-REFERENCE TO RELATED APPLICATIONS

The present application claims priority from Japanese Patent Application No. JP 2007-035886 filed in the Japanese Patent Office on Feb. 16, 2007, the entire content of which is incorporated herein by reference.

BACKGROUND OF THE INVENTION

1. Field of the Invention

The present invention relates to a viewfinder, and a control method and an imaging apparatus thereof.

2. Description of the Related Art

Some commercial imaging apparatuses, which are employed at broadcasting stations and so forth, include a camera body for shooting a subject to generate picture signals, and a viewfinder, which is attached to a camera body, for displaying a picture based on picture signals. With this type of imaging apparatus, a cameraman shoots while carrying the camera body on the shoulder and looking into the viewfinder.

As the viewfinder of such an imaging apparatus, a viewfinder has been provided wherein are detachably provided a display unit which includes a display panel, and displays a picture on the display surface of the display panel, and an eyepiece unit, which is detachably attached to the display unit, for reflecting a picture displayed on the display surface at a mirror to refract the optical path 90 degrees, and also enlarging the picture thereof (see Japanese Unexamined Patent Application Publication No. 2004-147232).

With this viewfinder, the cameraman can remove the eyepiece unit from the display unit depending on the shooting situation, whereby the cameraman can shoot while visually recognizing the picture displayed on the display surface directly. Further, there is provided a detecting switch for detecting whether or not the eyepiece is attached to the display unit, and in the event of detecting the eyepiece unit being attached, a picture to be displayed on the display surface is horizontally inverted, whereby the cameraman can visually recognize the picture of which the relation between the left and right positions is correct even in the case of looking into the eyepiece unit.

SUMMARY OF THE INVENTION

With such an existing viewfinder, in the event of using the eyepiece unit, a cameraman can visually recognize the display surface without being influenced by external light under a shooting environment, whereby it is sufficient for visual recognition that a picture has low brightness, indeed, too high a brightness causes the cameraman to sense glare and reduced visual rocognition.

On the other hand, in the event of visually recognizing the display surface directly, external light under a shooting environment irradiates the display surface, and accordingly, in order to visually recognize a picture clearly, it is necessary to increase the brightness of the picture so as to handle the external light.

Accordingly, with an existing viewfinder, a cameraman needs to adjust the brightness of a picture by operating a brightness adjustment knob or the like each time the cameraman changes the attached state of the eyepiece unit, meaning poor ease-of-use.

Also, the present assignee has proposed an imaging apparatus whereby a cameraman can visually recognize the display surface directly while shooting with the camera body being carried on the shoulder and the display panel being set to a standing state, but even in this case, there is a possibility that the display surface can readily be influenced by external light, which causes a possibility that the cameraman cannot visually recognize the display surface readily, and operating a brightness adjustment knob or the like each time the cameraman changes the attachment state of the eyepiece unit.

There has been recognized a need to provide a viewfinder, and a control method and imaging apparatus thereof, whereby the improvement of operability can be realized, and also the visual recognition of a picture can be increased.

A viewfinder according to an embodiment of the present invention includes: a display unit including a display surface on which a picture is displayed based on a picture signal supplied from an imaging apparatus; and an eyepiece unit, which is detachably attached to the display unit, configured to enlarge a picture displayed on the display surface to make the picture visually recognizable; wherein the display unit includes the display surface, a display control unit configured to display the picture on the display surface based on the picture signal, and a detecting unit configured to detect the presence/absence of attachment of the eyepiece unit; and wherein the display control unit is configured so as to laterally invert a picture to be displayed on the display surface based on the detection of the detecting unit, and also so as to change the brightness of a picture to be displayed on the display surface.

Also, a control method of a viewfinder according to an embodiment of the present invention including a display unit including a display surface on which a picture is displayed based on picture signals supplied from an imaging apparatus, and a display control unit configured to display the picture on the display surface, and an eyepiece unit, which is detachably attached to the display unit, configured to enlarge a picture displayed on the display surface to make the picture visually recognizable, the control method comprising the steps of: detecting the presence/absence of attachment of the eyepiece unit; and laterally inverting a picture to be displayed on the display surface based on the detection, and also changing the brightness of a picture to be displayed on the display surface.

Also, an imaging apparatus according to an embodiment of the present invention includes: a camera body configured to imaging a picture; and a viewfinder provided on the camera body; wherein the viewfinder includes a display unit including a display surface on which a picture is displayed based on a picture signal supplied from the camera body, and an eyepiece unit, which is detachably attached to the display unit, configured to enlarge a picture displayed on the display surface to make the picture visually recognizable; and wherein the display unit includes the display surface, a display control unit configured to display the picture on the display surface based on the picture signal, and a detecting unit configured to detect the presence/absence of attachment of the eyepiece unit; and wherein the display control unit is configured so as to laterally invert a picture to be displayed on the display surface based on the detection of the detecting unit, and also so as to change the brightness of a picture to be displayed on the display surface.

According to an embodiment of the present invention, an arrangement is made wherein a picture to be displayed on the display surface is laterally inverted based on the detection of the detecting unit, and also the brightness of a picture to be displayed on the display surface is changed.

Accordingly, it goes without saying that a cameraman can visually recognize a picture of which the relation of the left and right positions is correct without performing particular operations in each case of the case of visually recognizing the display surface via the eyepiece unit, and the case of visually recognizing the display surface directly via no eyepiece unit, and further the cameraman can visually recognize a picture having suitable brightness corresponding to the presence/absence of the eyepiece unit, which is advantageous to realizing improvement in operability, and also improving the visual recognition of a picture and the visual recognition of lamps.

BRIEF DESCRIPTION OF THE DRAWINGS

FIG. 13 is a perspective view of the eyepiece unit;

FIG. 14 is a plan view of the main unit, display portion, and eyepiece unit;

FIG. 15 is a view taken along arrow A in FIG. 14;

FIG. 16 is an explanatory diagram of an attached state of the eyepiece unit;

DESCRIPTION OF THE PREFERRED EMBODIMENTS

Figure 1:
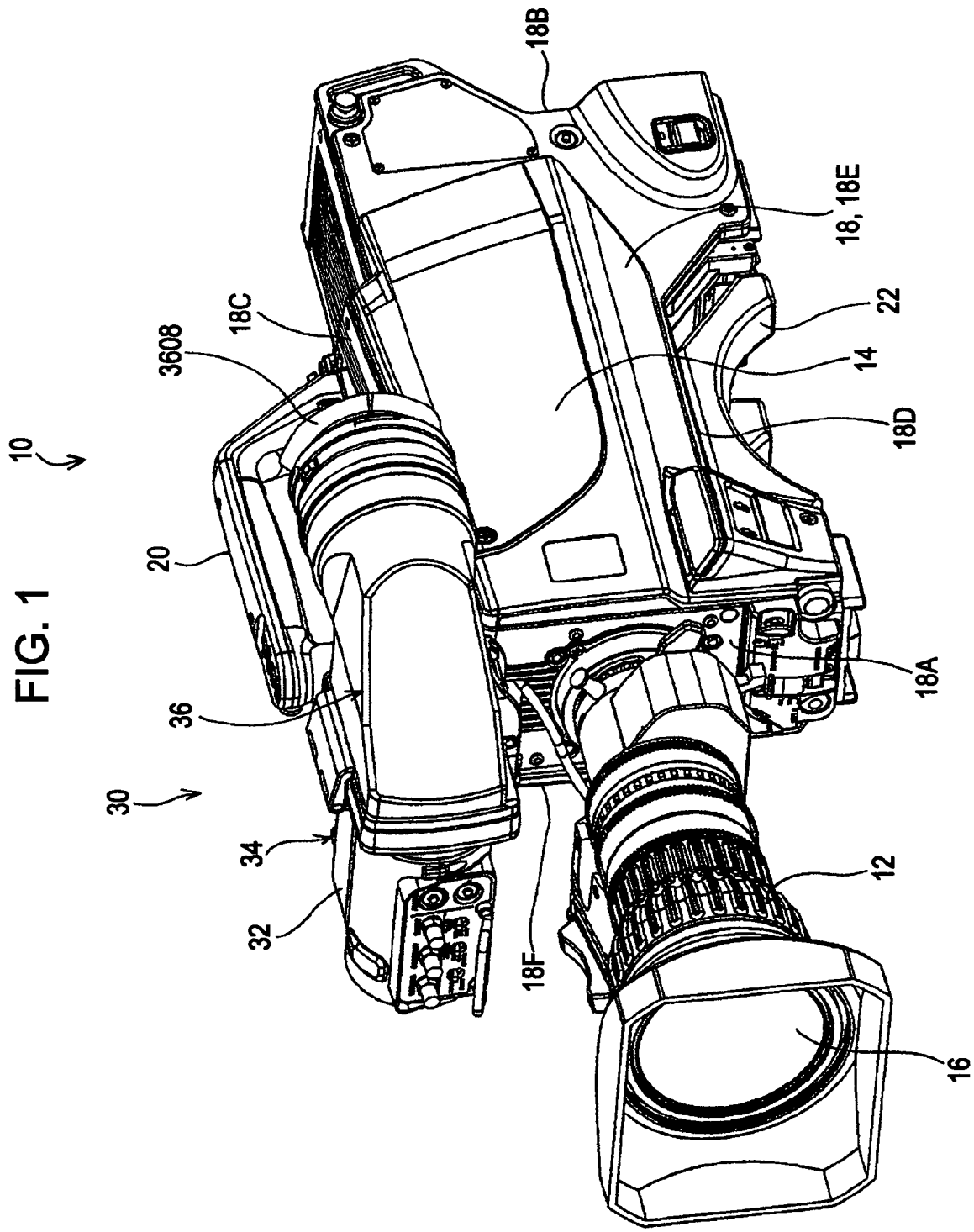
FIG. 1 is a perspective view of an imaging apparatus to which a viewfinder is attached.
Figure 2:
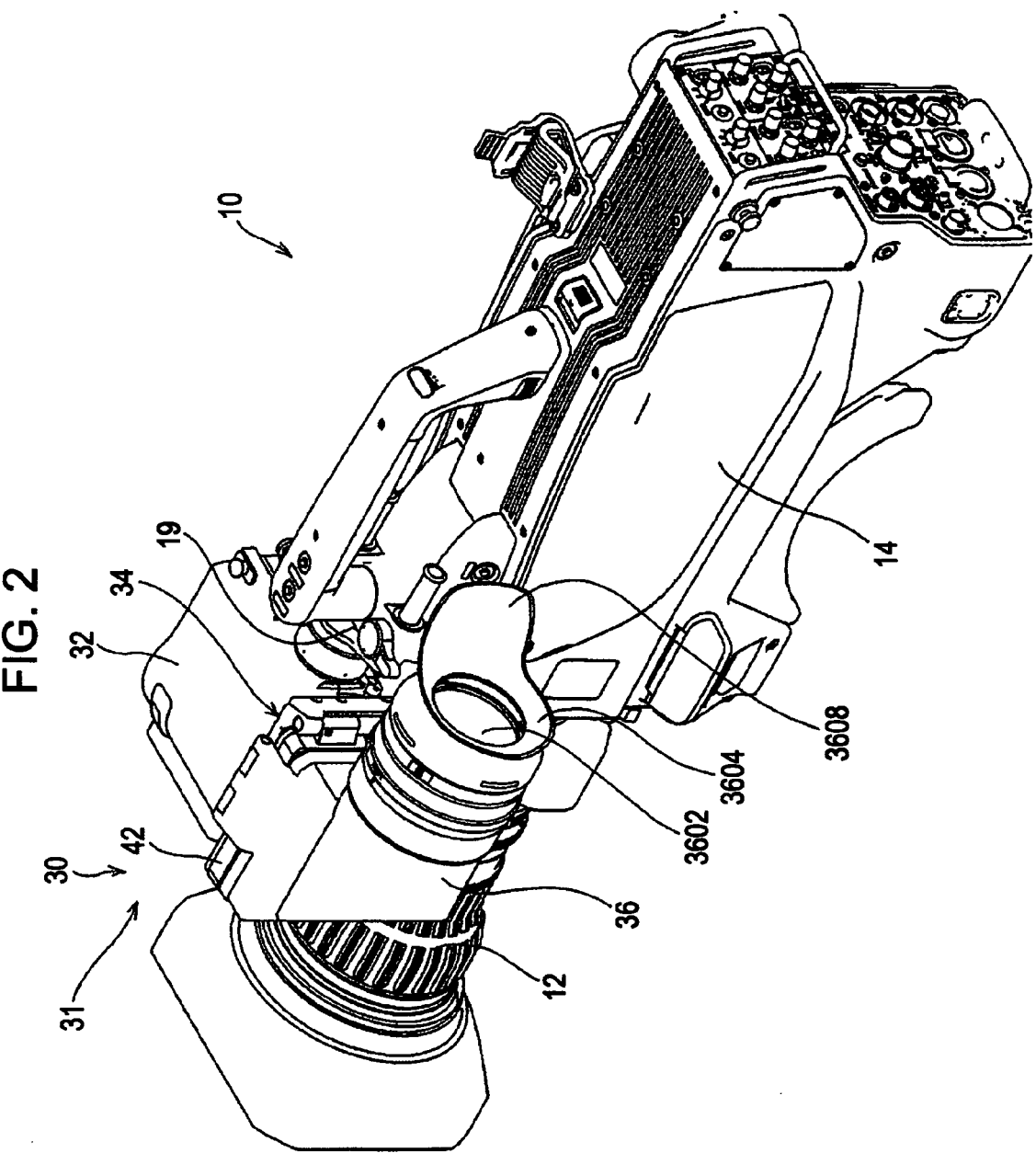
FIG. 2 is a perspective view of the imaging apparatus to which the viewfinder is attached.
Figure 3:
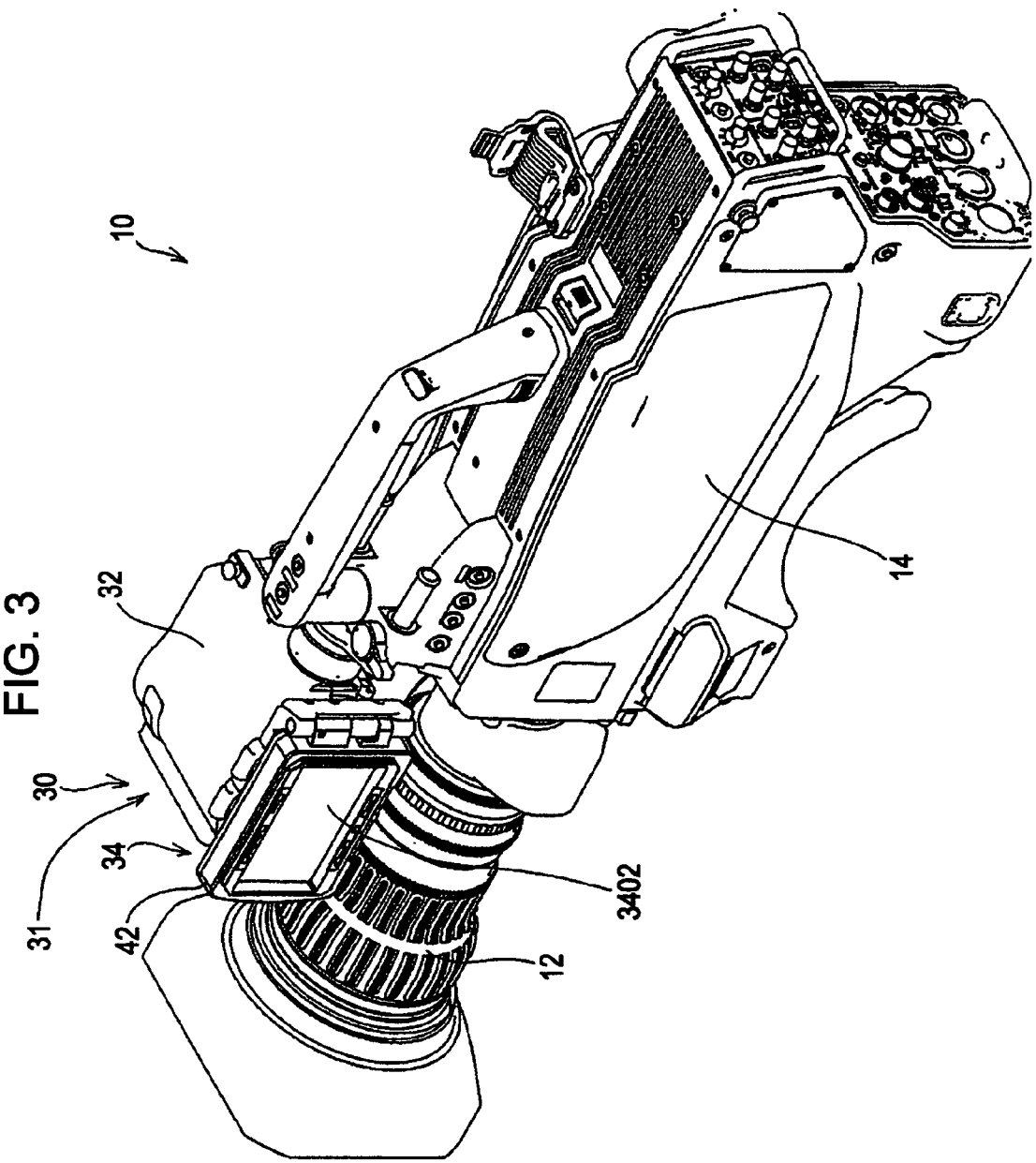
FIG. 3 is a perspective view of the imaging apparatus which illustrates a state in which an eyepiece is removed from the viewfinder, and a display panel faces the left lateral direction.
Figure 4:
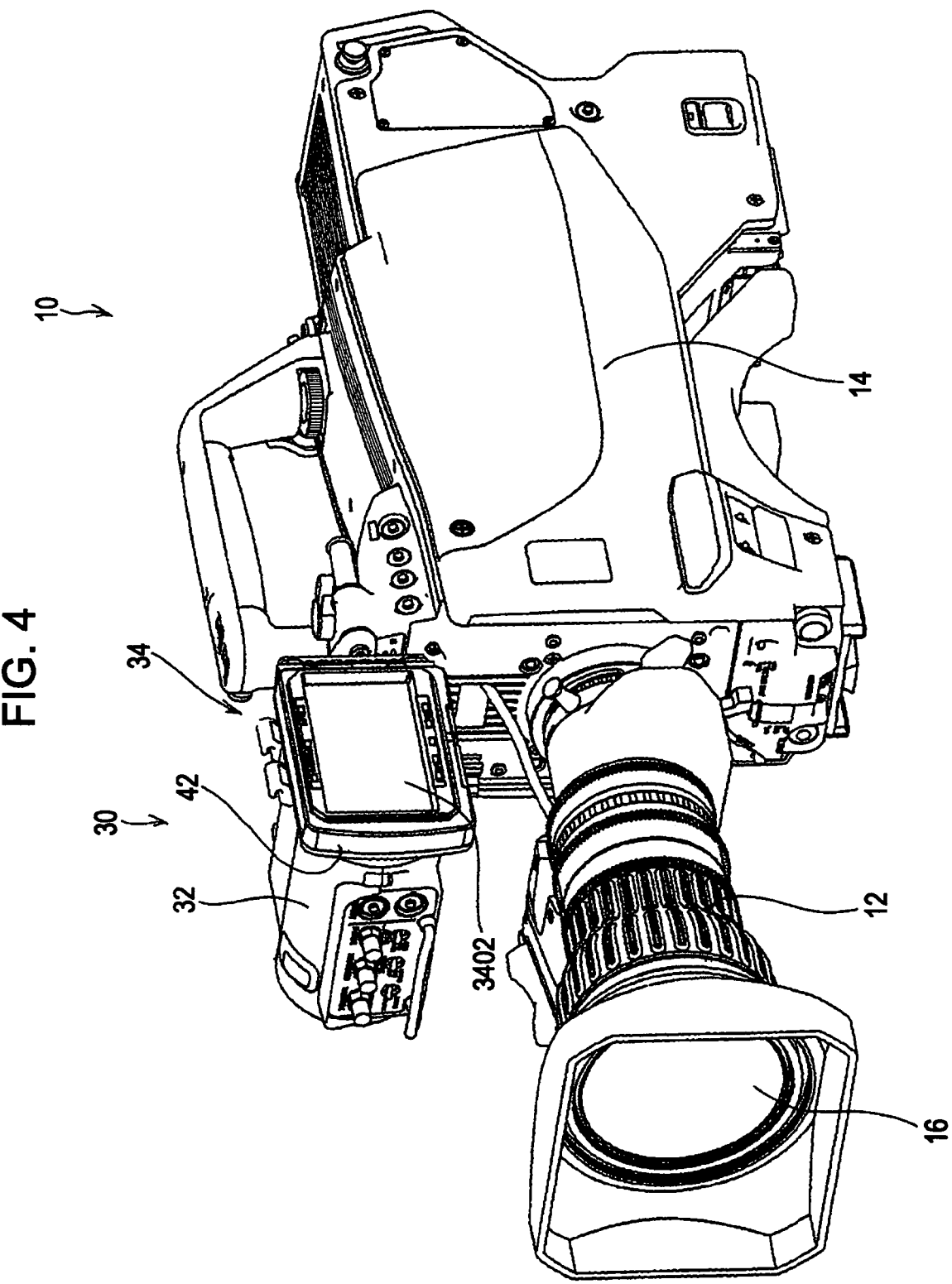
FIG. 4 is a perspective view of the imaging apparatus which illustrates a state in which the eyepiece is removed from the viewfinder, and the display panel faces the left lateral direction.
Figure 5:
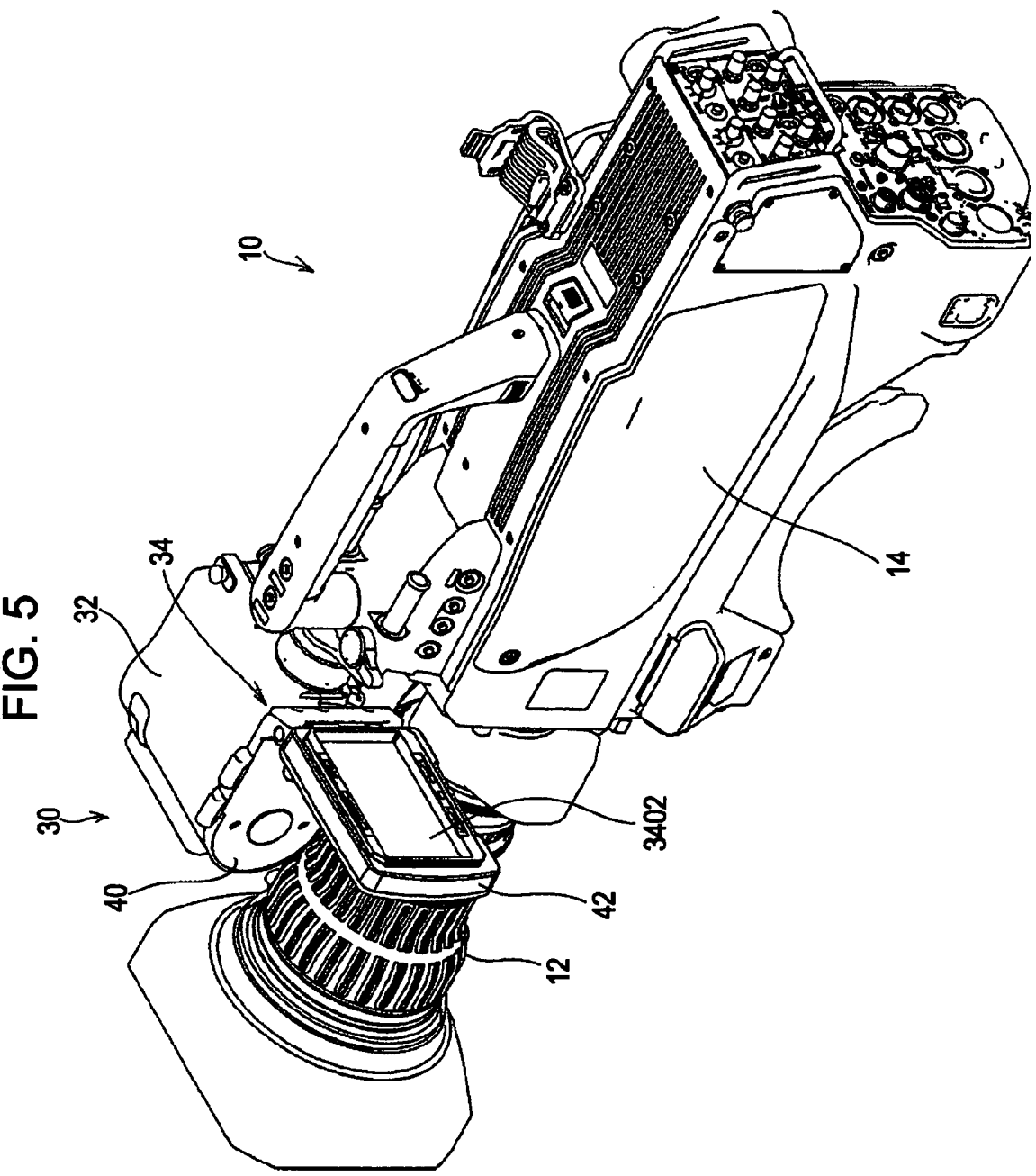
FIG. 5 is a perspective view illustrating the display panel in a standing state in which the eyepiece unit is removed from the viewfinder.
Figure 6:
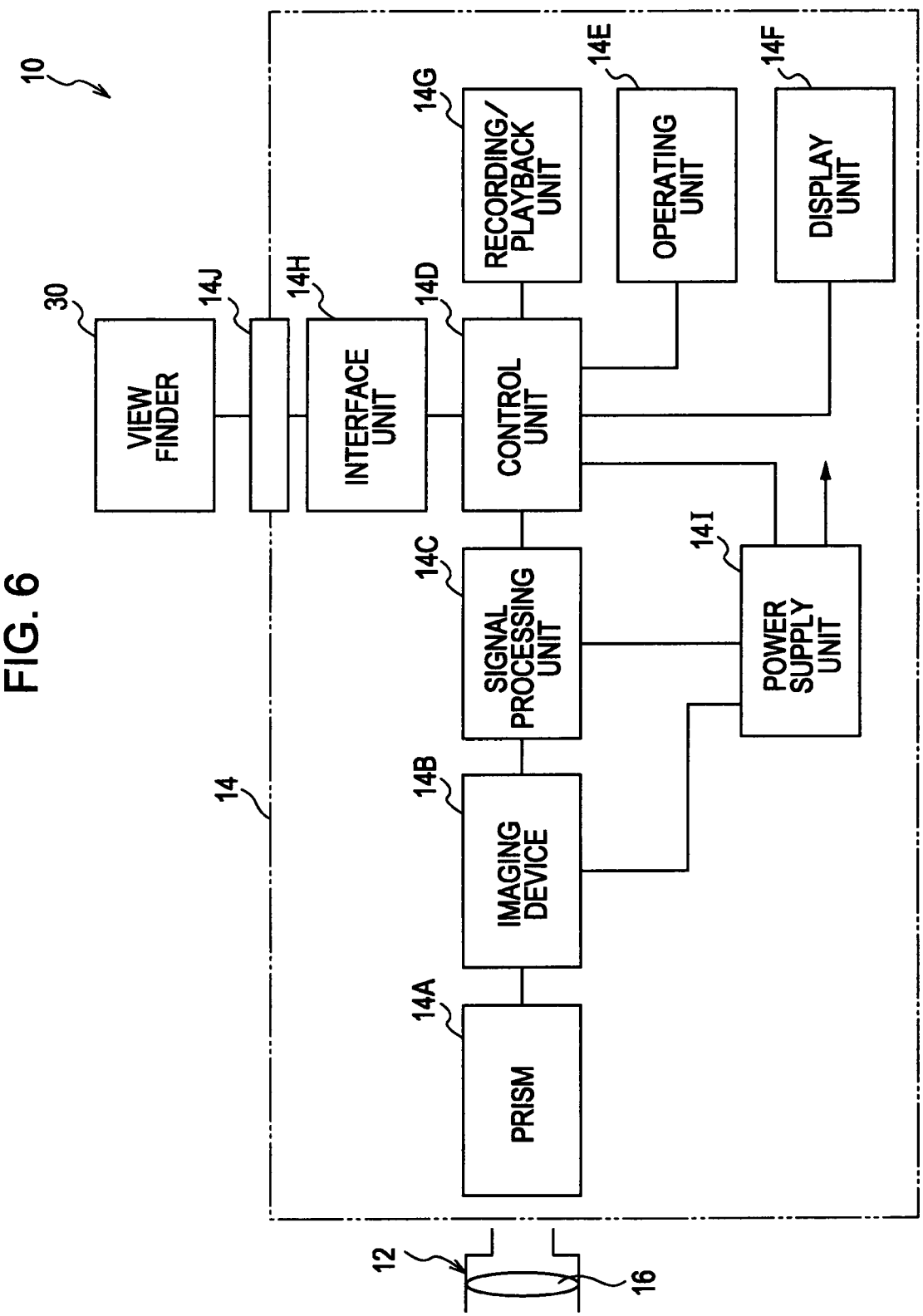
FIG. 6 is a block diagram illustrating the configuration of the imaging apparatus.

Next, description will be made regarding an embodiment of the present invention with reference to the drawings. FIGS. 1 and 2 are perspective views of an imaging apparatus 10 to which a viewfinder 30 is attached, FIGS. 3 and 4 are perspective views of the imaging apparatus 10, which illustrate a state in which an eyepiece 36 is removed from the viewfinder 30, and a display panel 42 faces the left lateral direction, FIG. 5 is a perspective view illustrating the display panel 42 in a standing state in which the eyepiece unit 36 is removed from the viewfinder 30, and FIG. 6 is a block diagram illustrating the configuration of the imaging apparatus 10.

With the present embodiment, the imaging apparatus 10 is a commercial video camera employed by a broadcasting station or the like. As shown in FIG. 1, the imaging apparatus 10 includes a camera body 14 extending forward and backward, and a lens barrel 12 is attached to the front portion of the camera body 14.

Note that with the present specification, the left and right are assumed to be a state of viewing the imaging apparatus 10 from the back thereof, the subject side in the optical axis direction of an optical system will be referred to as forward, and the imaging device side thereof will be referred to as backward.

The lens barrel 12 houses a shooting optical system 16. The shooting optical system 16 guides a subject image to an imaging device 14B shown in FIG. 6. Note that as for the imaging device 14B, existing known various types of imaging devices can be employed, such as CCDs, C-MOS sensors, and so forth.

As shown in FIG. 1, the camera body 14 includes a casing 18 making up the exterior. The casing 18 includes a front face 18A facing forward, a back face 18B facing backward, left and right side faces 18C and 18D facing left and right lateral directions, an upper face 18E facing upward, and a lower face 18F facing downward.

With the present embodiment, the casing 18 is formed with a height dimension in the vertical direction between the upper face 18E and lower face 18F which is greater than a width dimension in the horizontal direction between the left and right side faces 18C and 18D, and a length dimension in the forward and backward directions between the front face 18A and back face 18B which is greater than the height dimension, and accordingly, the casing 18 exhibits a rectangular parallelepiped shape which is long forward and backward.

As shown in FIG. 2, the front portion of the casing 18 is provided with a camera main unit side attachment portion 19 configured to detachably attach a later-described viewfinder 30, and the back of the camera main unit side attachment portion 19 is provided with a handle for carrying 20.

As shown in FIG. 1, the lower face 18D is provided with a shoulder pad 22, which is recessed upward, for putting the imaging apparatus 10 on the shoulder. The shoulder pad 22 is made up of a member having elasticity and flexibility.

Next, description will be made regarding the viewfinder 30. As shown in FIGS. 2 and 3, the viewfinder 30 is configured so as to include a display unit 31, and an eyepiece unit 36. The display unit 31 is configured so as to include a main unit 32, and a display portion 34. The main unit 32 houses a circuit for operating the display portion 34. The display portion 34 displays a picture on a display surface 3402 based on the picture signals supplied from the camera body 14.

The eyepiece unit 36 enlarges and displays a picture displayed on the display surface 3402 of the display portion 34. With the present embodiment, the display portion 34 is configured so as to include a liquid crystal display device 132 (see FIG. 19) serving as a display device for displaying a picture. Note that the display device is not restricted to the liquid crystal display device, and existing known various types of display devices can be employed, such as an organic EL display apparatus and so forth.

Figure 7:
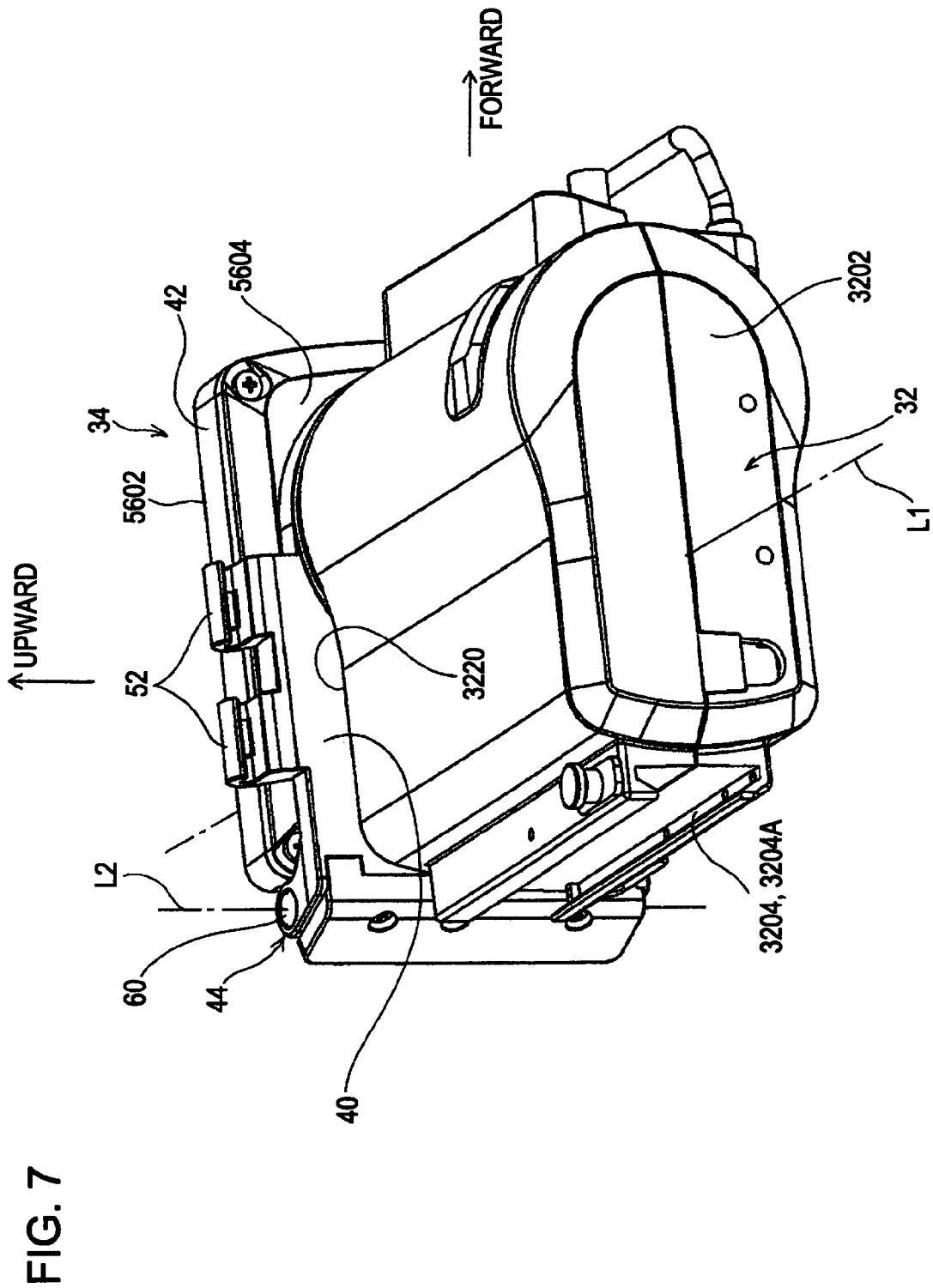
FIG. 7 is a perspective view of a main unit and a display portion.
Figure 8:
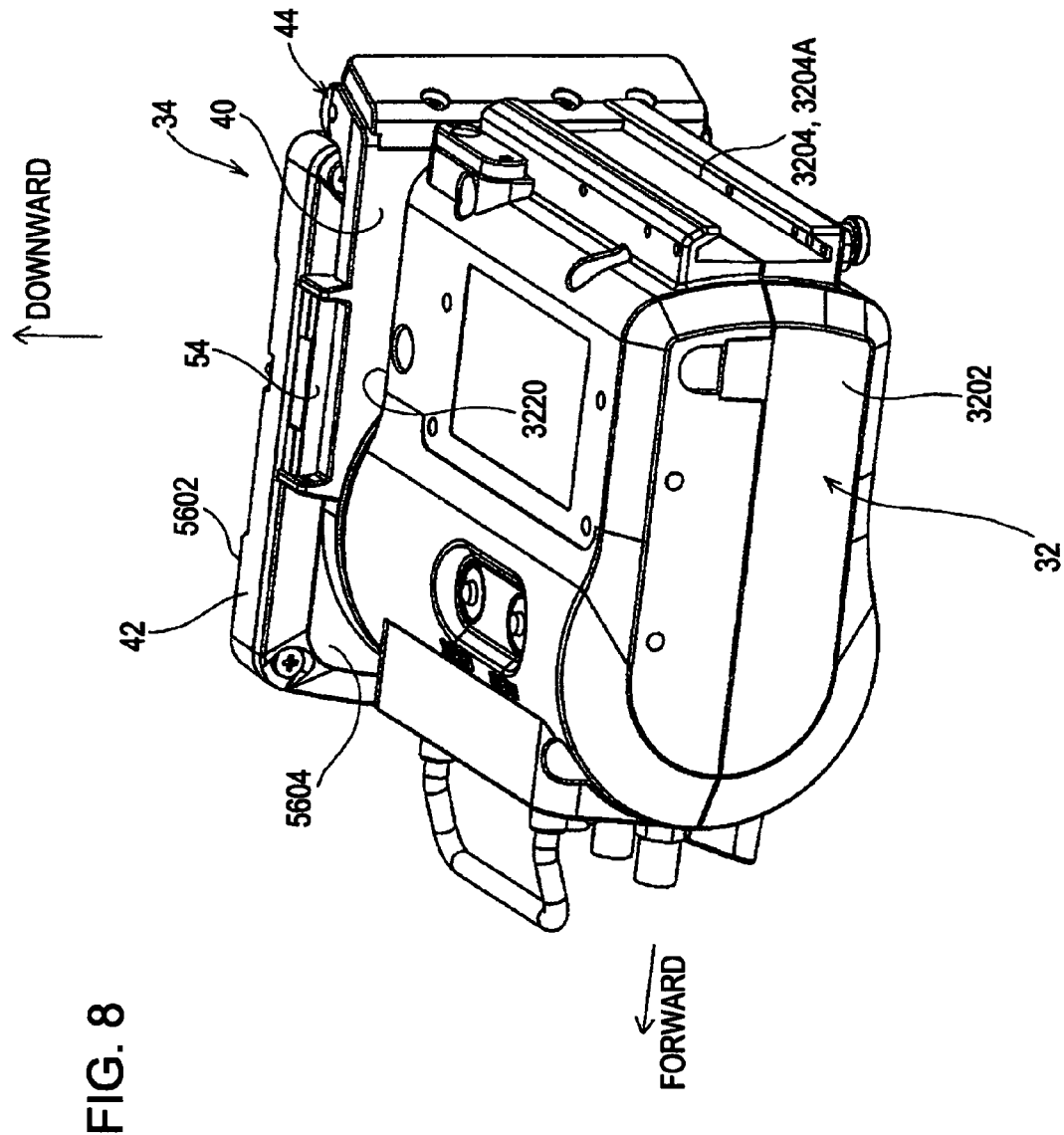
FIG. 8 is a perspective view reversing the upper and lower sides of the main unit and display portion.
Figure 9:
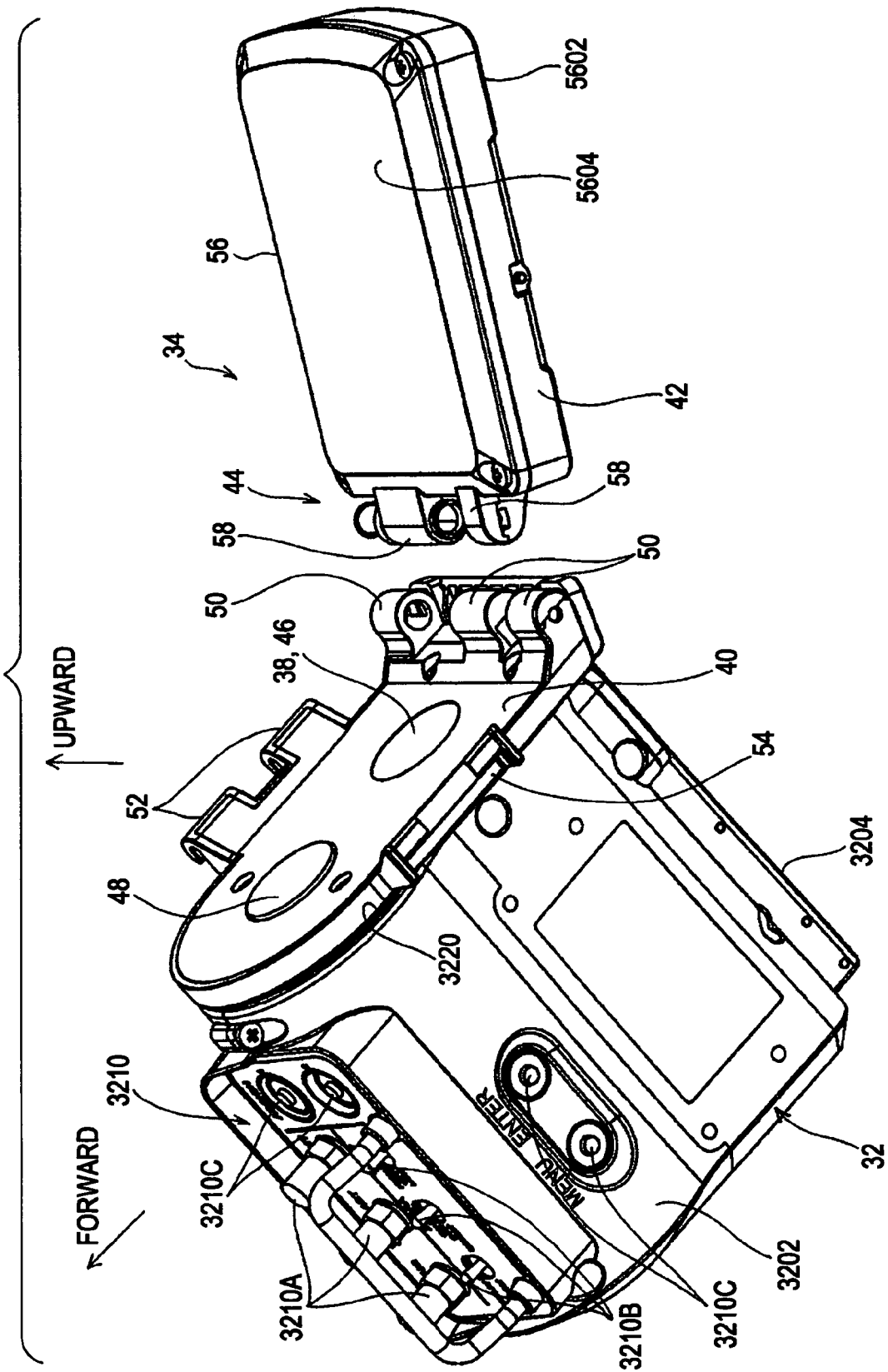
FIG. 9 is an exploded perspective view of the main unit and display portion.
Figure 10:
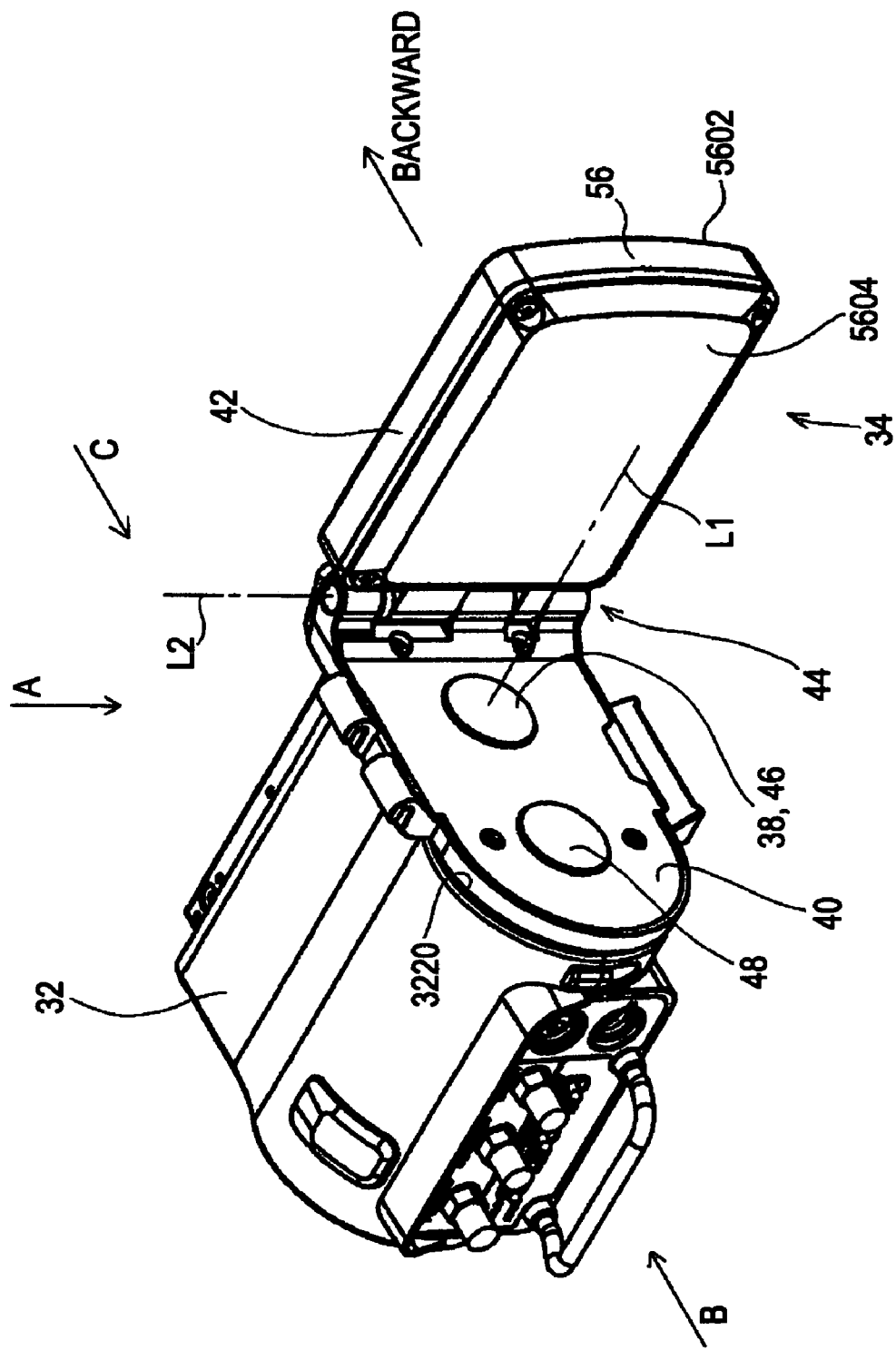
FIG. 10 is a perspective view illustrating a standing state of the display portion.
Figure 11A:
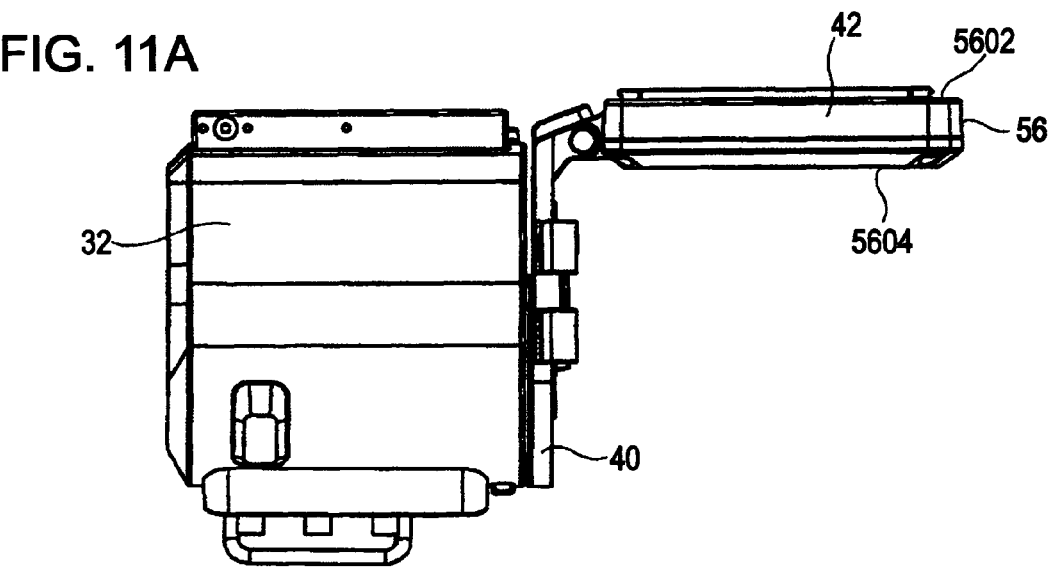
FIG. 11A is a view taken along arrow A in FIG. 10.
Figure 11B:
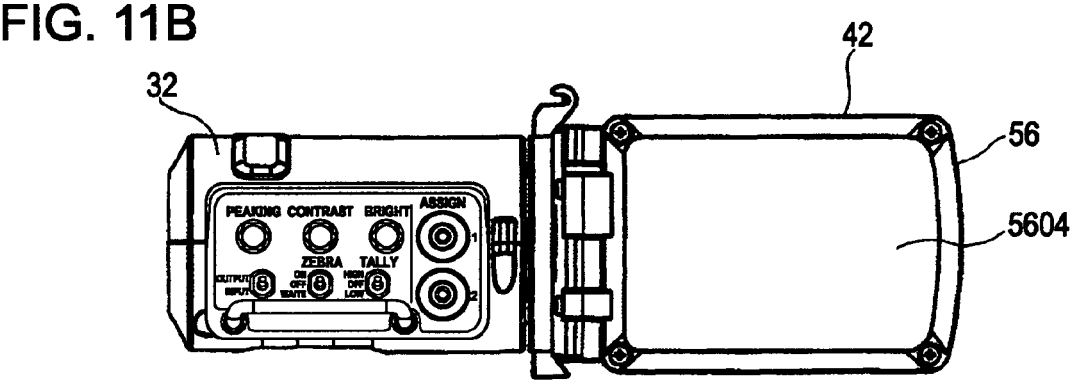
FIG. 11B is a view taken along arrow B in FIG. 10.
Figure 11C:
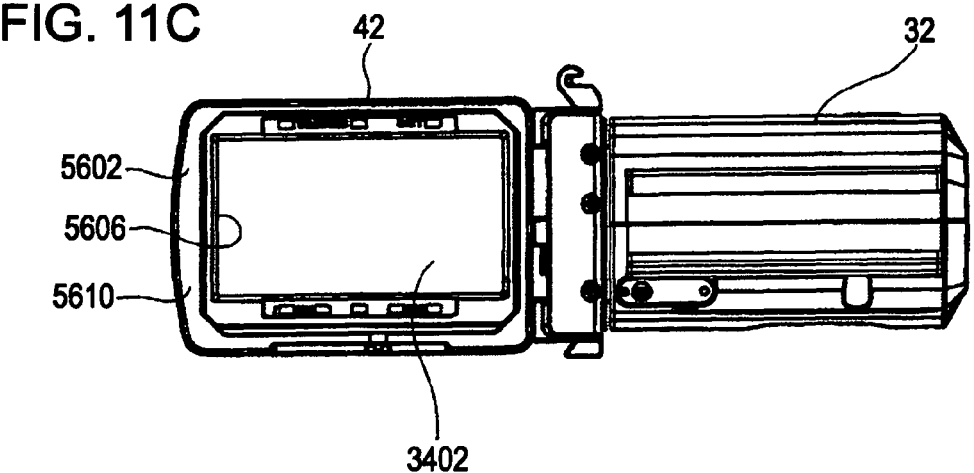
FIG. 11C is a view taken along arrow C in FIG. 10.

FIG. 7 is a perspective view of the main unit 32 and display portion 34, and FIG. 8 is a perspective view reversing the upper and lower sides of the main unit 32 and display portion 34. FIG. 9 is an exploded perspective view of the main unit 32 and display portion 34. FIG. 10 is a perspective view illustrating the standing state of the display portion 34, FIG. 11A is a view taken along arrow A in FIG. 10, FIG. 11B is a view taken along arrow B in FIG. 10, and FIG. 11C is a view taken along arrow C in FIG. 10.

As shown in FIGS. 7 and 8, the main unit 32 includes a case 3202, and the case 3202 is provided with a main unit side attachment portion 3204 which is detachably attached to the camera body side attachment portion 19.

With the present embodiment, the main unit side attachment portion 3204 is configured so as to include a engaging groove 3204A extended and formed in the horizontal direction of the back face facing backward in a state in which the main unit 32 is attached to the camera body 14. Note that as for a configuration for attaching/detaching the main unit side attachment portion 3204 and camera body side attachment portion 19, existing known various types of configurations can be employed.

As shown in FIG. 9, in a state in which the main unit 32 is attached to the camera body 14, the front face where the case 3202 faces forward, and the lower face where the case 3202 faces downward are provided with an operating member 3210 for allowing a cameraman to operate various types of operations relating to the operation of the display portion 34. The operating member 3210 includes multiple knobs 3210A, multiple changeover switches 3210B, and multiple pushbutton switches 3210C, and so forth.

Also, in a state in which the main unit 32 is attached to the camera body 14, as shown in FIGS. 7 and 8, the face facing left sideward is formed as a connection face 3220 which is connected with the display portion 34.

As shown in FIGS. 7 through 10, the display portion 34 is configured so as to include a supporting member 40, a display panel 42, and a connecting mechanism 44. The supporting member 40 is connected onto the connection face 3220 of the main unit 32 so as to rotate. Connection of the supporting member 40 to the main unit 32 is performed by a connecting mechanism 38, and the connecting mechanism 38 is configured so as to include a supporting shaft 46 supported by the main unit 32 so as to rotate and attached to the supporting member 40. In FIG. 10, reference symbol L1 denotes the rotation center of the supporting member 40, and the rotation center L1 extends in the horizontal direction of the camera body 14 in a state in which the main unit 32 is attached to the camera body 14.

Note that with the connecting mechanism 38, frictional resistance is applied to the supporting shaft 46, and the supporting member 40 is configured so as to be held with a desired swing angle. As for the connecting mechanism 38, existing known various types of configurations can be employed, such as a mechanism employing this frictional resistance method, a mechanism employing a click mechanism method, or the like. The supporting member 40 is made up of an elongated-shape plate material with the horizontal width being greater than the vertical height.

The face of the supporting member 40 positioned at the opposite side of the connection face 3220 is provided with an elastic member 48. This face of the supporting member 40 is a face facing a back face 5604 of the display panel 42 in a later-described laid state. The elastic member 48 is made up of, for example, a material having elasticity, such as rubber, urethane foam, or the like, in a thin disc shape, and with the present embodiment, the elastic member 48 is housed in a recessed portion formed on the face of the supporting member 40, and provided so as to protrude from the above-mentioned face.

As shown in FIG. 9, multiple bearing portions 50 are formed in bulb-shaped forms on the end portion in the longitudinal direction of the supporting member 40. Also, as shown in FIGS. 7 and 9, of the both sides in the direction orthogonal to the longitudinal direction of the supporting member 40, one side portion is provided with a arc-shaped bearing wall 52. Also, as shown in FIGS. 8 and 9, of the above-mentioned both sides, the other side portion is provided with a retaining recessed portion 54.

Figure 19:
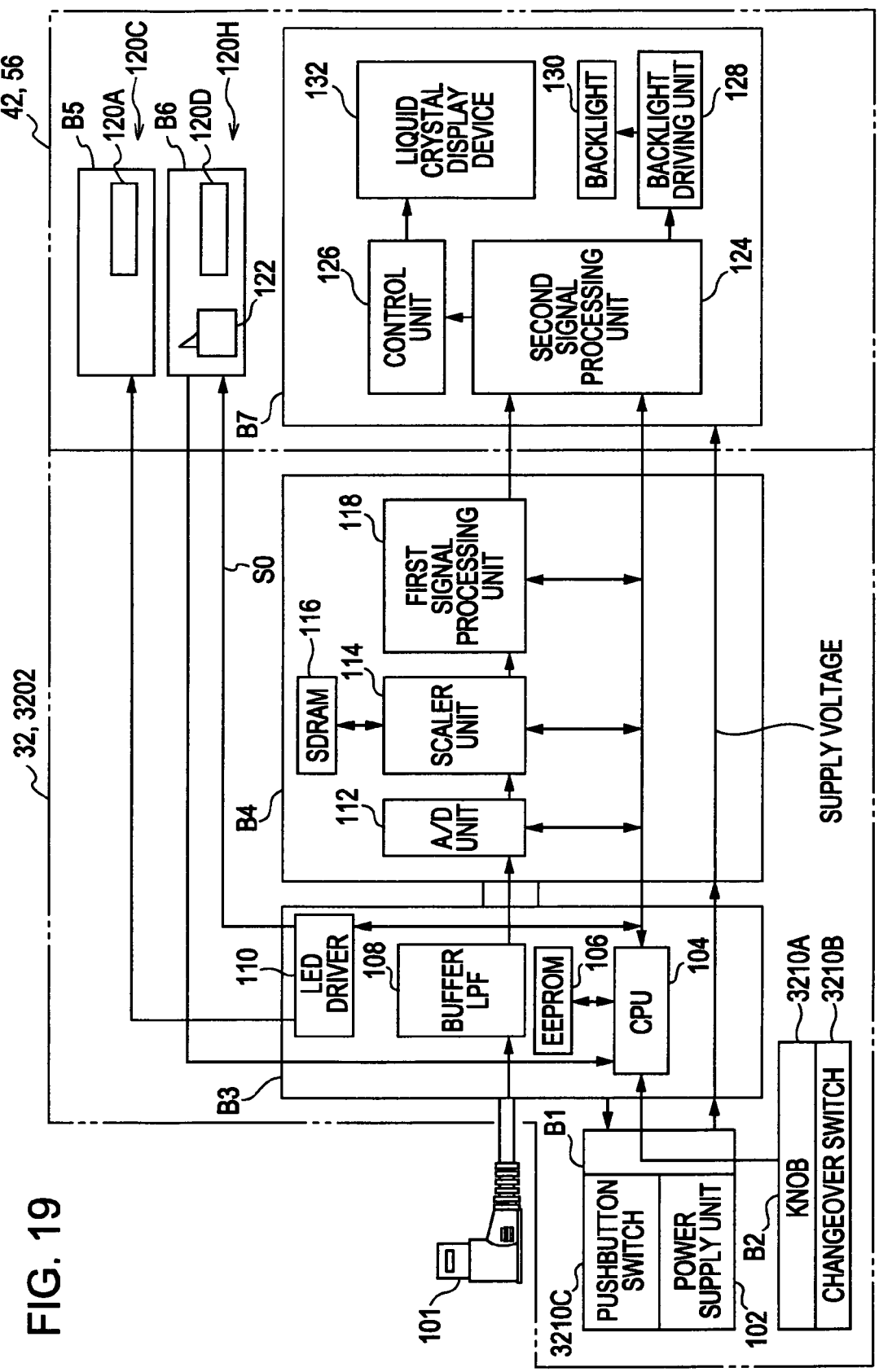
FIG. 19 is a block diagram illustrating the configuration of the control system of the viewfinder.

As shown in FIGS. 9 and 10, the display panel 42 includes a rectangular plate-like case 56, and the case 56 houses the liquid crystal display device 132 (see FIG. 19). As shown in FIGS. 10 through 11C, the case 56 includes a front face 5602, and a back face 5604 located at the opposite side of the front face 5602. The front face 5602 is configured so as to include a front face plate 5610 where an opening 5606 is formed, and the display surface 3402 provided so as to be located in the inside of the opening 5606.

As shown in FIG. 9, a bearing portion 58 to be inserted between the multiple bearing portions 50 is formed in a bulb-shaped form at the short side portion of the case 56. The supporting member 40 and display panel 42 are coupled by the bearing portion 58 being inserted between the bearing portions 50, and by a supporting shaft 60 (see FIG. 7) being inserted between the bearing portions 50 and 58.

Accordingly, with the present embodiment, the connecting mechanism 44 connects the short side portion of the display panel 42 and the end portion in the longitudinal direction of the supporting member 40, and in a state in which the main unit 32 is attached to the camera body 14, the supporting shaft 60 extends in the vertical direction of the camera body 14.

Also, with the present embodiment, the bearing portions 50, bearing portion 58, supporting shaft 60, and so forth make up the connecting mechanism 44. This connecting mechanism 44 is configured so as to hold the display panel 42 with a desired swing angle by frictional resistance being applied to the supporting shaft 60. As for the connecting mechanism 44, existing known various types of configurations can be employed, such as a mechanism employing this frictional resistance method, a mechanism employing a click mechanism method, or the like.

According to the connecting mechanism 44, the supporting member 40 and display panel 42 are connected so as to swing with the supporting shaft 60 as the center between a laid state in which the display panel 42 is laid on the supporting member 40 (see FIGS. 3 and 7) and a standing state in which the display panel 42 stands from the supporting member 40 (see FIGS. 5 and 10). Note that in FIG. 7, reference symbol L2 denotes the swing center of the display panel 42.

As shown in FIG. 7, in a laid state, the back face 5604 faces the supporting member 40, and the front face 5602 is directed outward. In more detail, as shown in FIG. 3, in a state in which the main unit 32 is attached to the camera body 14, upon the display panel 42 being changed to a laid state, the display surface 3402 of the display panel 42 is directed to the left outward direction of the camera body 14, and as shown in FIG. 5, upon the display panel 42 being changed to a standing state, the display surface 3402 of the display panel 42 is directed backward.

Figure 12:
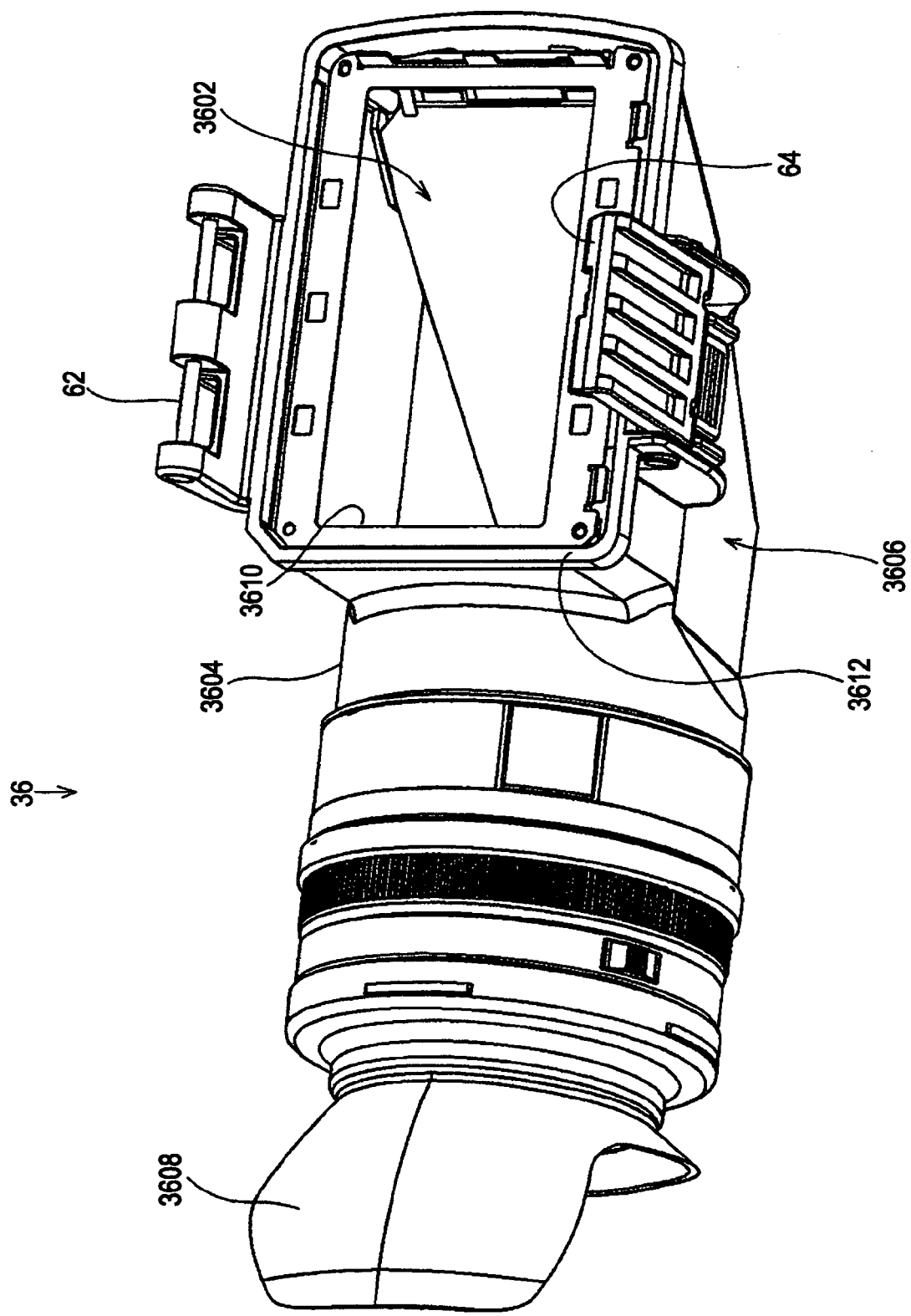
FIG. 12 is a perspective view of the eyepiece unit.

FIGS. 12 and 13 are perspective views of the eyepiece unit 36, FIG. 14 is a plan view of the main unit 32, display portion 34, and eyepiece unit 36, FIG. 15 is a view taken along arrow A in FIG. 14, and FIG. 16 is an explanatory diagram of the state of attaching the eyepiece unit 36.

As shown in FIGS. 12 and 13, the eyepiece unit 36 is configured so as to include an optical system 3602 including a mirror and multiple lenses, a cylindrical-shaped housing 3604 for housing the optical system, an eyepiece unit side attachment portion 3606 provided on one end portion in the longitudinal direction of the housing 3604, an eyepiece 3608 provided on the other end portion in the longitudinal direction of the housing 3604, and so forth. The eyepiece unit side attachment portion 3606 includes an oblong opening of which the side corresponds to the display surface 3402.

As shown in FIGS. 12 through 15, a frame portion 3612 capable of pressing the front face plate 5610 of the display panel 42 is extended and formed along the periphery of the opening 3610. Also, a supporting shaft 62 which is attached/detached to/from the bearing wall 52 is provided above the opening 3610, and a retaining pawl 64 which is engaged/unengaged as to the retaining recessed portion 54 is provided below the opening 3610.

As shown in FIG. 16, the attached state of the eyepiece unit 36 to the display portion 34 is, in a laid state, formed by the frame portion 3612 pressing the front face plate 5610, and the elastic member 48 being compressed by the supporting member 40 and the back face 5604 of the display panel 42.

In more detail, in a laid state, the supporting shaft 62 is engaged with the bearing wall 52, and the retaining pawl 64 is retained at the retaining recessed portion 54. Thus, the frame portion 3612 presses the front face plate 5610, the elastic member 48 is compressed by the supporting member 40 and the back face 5604 of the display panel 42, thereby forming the attached state of the eyepiece unit 36 to the display portion 34.

Accordingly, an attaching/detaching mechanism for performing attaching/detaching of the eyepiece unit 36 as to the display portion 34 is made up of the supporting shaft 62, bearing wall 52, retaining pawl 64, and retaining recessed portion 54. Note that as for such an attaching/detaching mechanism, existing known various types of configurations can be employed.

Figure 17A:
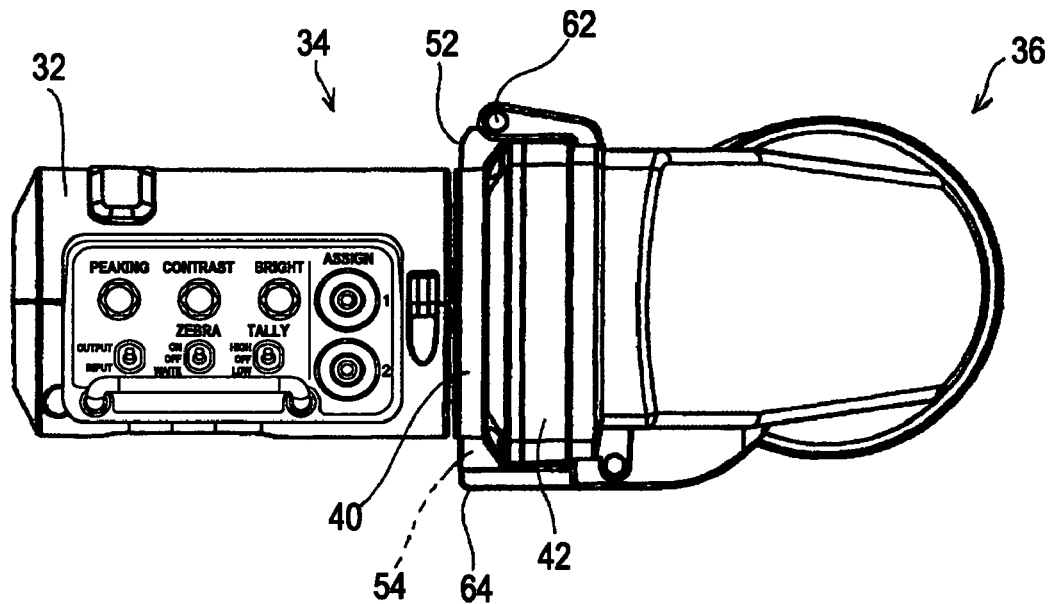
FIGS. 17A and 17B are explanatory diagrams illustrating the time of removing the eyepiece unit from the display portion.
Figure 17B:
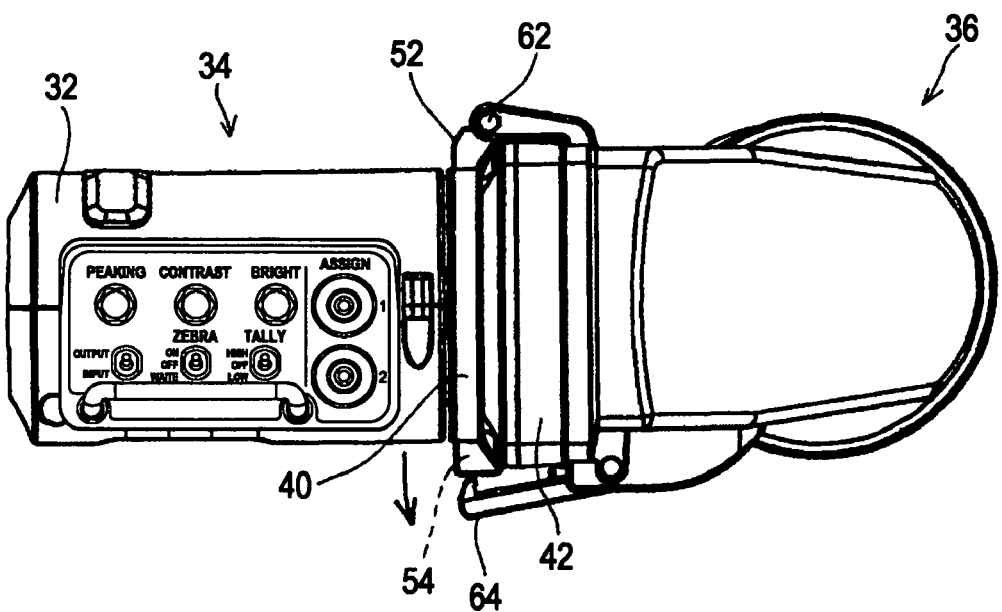

FIGS. 17A through 18B are explanatory diagrams illustrating the time of removing the eyepiece unit 36 from the display portion 34. As shown in FIG. 17A, in a state in which the eyepiece unit 36 is attached to the display portion 34, as shown in FIG. 17B, the retaining pawl 64 is operated in the direction where the retaining pawl 64 is removed from the retaining recessed portion 54.

Figure 18A:
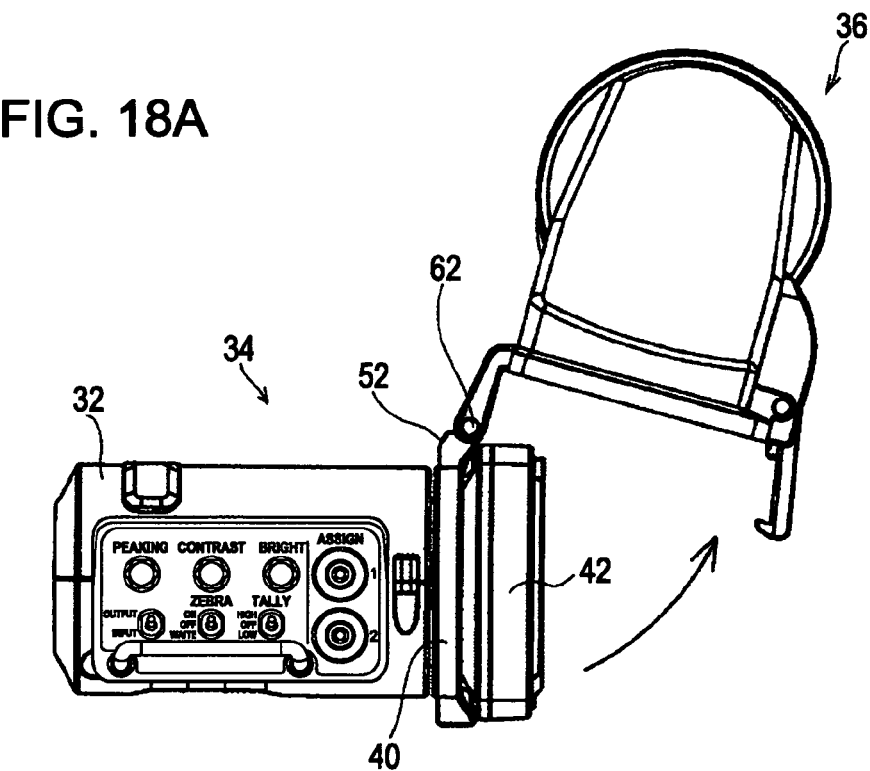
FIGS. 18A and 18B are explanatory diagrams illustrating the time of removing the eyepiece unit from the display portion.
Figure 18B:
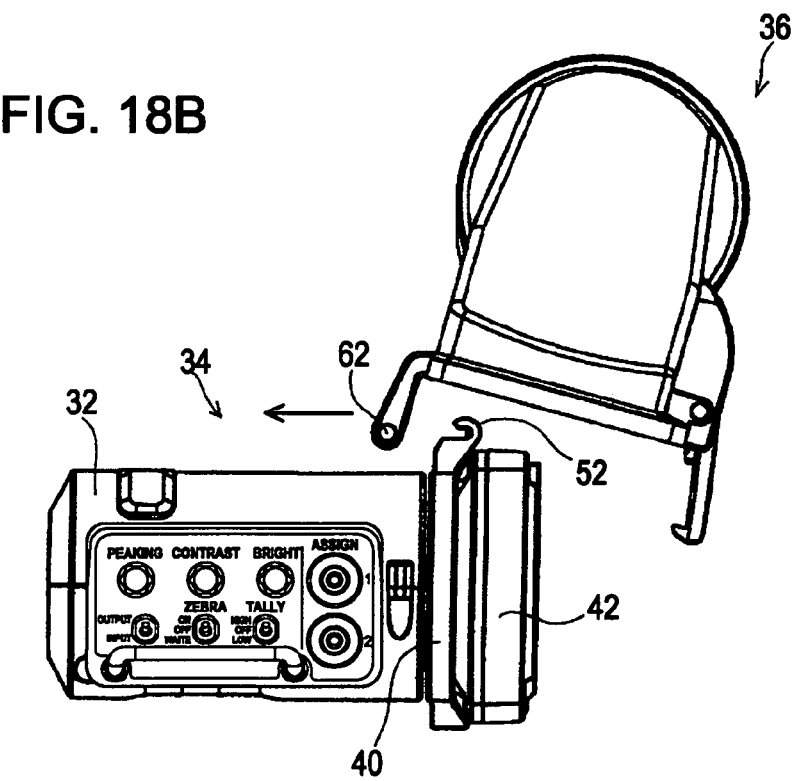

Upon the retaining pawl 64 being removed from the retaining recessed portion 54, as shown in FIG. 18A, the eyepiece unit 36 is moved rotationally with the supporting shaft 62 as a supporting point, and as shown in FIG. 18B, the supporting shaft 62 is removed from the bearing wall 52. Thus, the eyepiece unit 36 is removed from the display portion 34.

Next, description will be made regarding a method for using the imaging apparatus 10 and viewfinder 30. As shown in FIGS. 1 and 2, in the event of attaching the eyepiece unit 36 to the display portion 34, a cameraman can visually recognize an enlarged picture on the display surface 3402 by looking into the eyepiece 3608. In this case, the display panel 42 and eyepiece unit 36 are moved rotationally with the rotation center L1 as the center, whereby a shooting angle can be changed in the vertical direction arbitrarily.

Accordingly, for example, even in the event of putting the shoulder pad 22 of the camera body 14 on the shoulder, or even in the event of holding the camera body 14, the cameraman can look into within the eyepiece 3608 with an easy posture.

Also, as shown in FIGS. 3 and 4, in the event that the eyepiece unit 36 is removed from the display portion 34, and as shown in FIG. 5, the display panel 42 is swung with the swing center L2 as the center to be changed to a standing state, even when putting the shoulder pad 22 of the camera body 14 on the shoulder, the display surface 3402 is directed backward, so the cameraman can view the display surface 3402 with the naked eye directly. Also, even when holding the camera body 14, the cameraman can rotate the display panel 42 with the rotation center L1 as the center, whereby the cameraman can view the display surface 3402 with an easy posture with the naked eye directly, and accordingly, can shoot while viewing the display surface 3402 with the naked eye directly, and changing a shooting angle in the vertical direction.

Accordingly, even when putting the camera body 14 on the shoulder or holding the camera body 14, the cameraman can shoot while visually recognizing the display surface 3402 of the display panel 42 directly with an easy posture.

According to such an arrangement, in the event of removing the eyepiece unit 36 from the display portion 34, and visually recognizing the display surface 3402 of the display panel 42 directly, the cameraman can set the display panel 42 to a standing state, and also can rotate the display panel 42 in a standing state on the main unit 32, whereby the cameraman can readily visually recognize the display surface 3402 of the display panel 42 without being forced with an unnatural posture, and also can change a shooting angle arbitrarily, which is advantageous to realizing improvement in ease of use.

Also, according to such an arrangement, in the event of attaching the eyepiece unit 36 to the display portion 34, and using this, the display panel 42 is in a laid state, in a state in which the eyepiece unit 36 is attached, the elastic member 48 is compressed by the supporting member 40 and the back face 5604 of the display panel 42, so the display panel 42 which swings between a standing state and a laid state does not shake due to the attached state of the eyepiece unit 36, which is advantageous in securing the visual recognition of the display surface 3402 at the time of looking into the eyepiece 3608.

Next, description will be made regarding the configuration of the control system of the camera body 14 with reference to FIG. 6. As shown in FIG. 6, the camera body 14 is configured so as to include, in addition to the above-mentioned imaging device 14B, a prism 14A, a signal processing unit 14C, a control unit 14D, an operating unit 14E, a display unit 14F, a recording/playback unit 14G, an interface unit 14H, a power supply unit 14I, and so forth.

With the present embodiment, three imaging devices 14B corresponding to three colors (red, green, and blue) respectively are provided, and the prism 14A separates light flux making up a subject image guided from the shooting optical system 16 into three colors (red, green, and blue), and guides each of these to the imaging device 14B corresponding to each color.

The signal processing unit 14C drives each imaging device 14B, and also subjects the picture signal supplied from each imaging device 14B to a series of preprocessing, such as CDS (Correlated Double Sampling) processing to keep an excellent S/N ratio, and also AGC (Automatic Gain Control) processing to control gain, and further, AID (Analog/Digital) conversion to generate picture data converted into a digital signal, and so forth, and further, compresses (encodes) the picture data subjected to the preprocessing using a predetermined compression method, thereby generating picture data for recording data. The generated picture data for recording is supplied to the recording/playback unit 14G via the control unit 14D.

Also, the signal processing unit 14C supplies a picture signal which is an analog signal before conversion into a digital signal to the later-described viewfinder 30 via a connector 14J, thereby displaying a picture during shooting on the viewfinder 30. Also, the signal processing unit 14C supplies the picture signal subjected to the above-mentioned preprocessing to an external display apparatus or the like via the connector 14J, thereby displaying a picture while shooting on the external display apparatus or the like.

The recording/playback unit 14G records the picture data for recording supplied from the signal processing unit 14C via the control unit 14D in a recording medium, and also supplies the picture data played from the recording medium to the viewfinder 30 or the external display apparatus via the control unit 14D. As for the recording medium, existing known recording media can be employed, for example, such as a magnetic recording tape, an optical disc, or a hard disk, or the like.

The interface unit 14H performs exchange of a picture signal, and exchange of a control signal relating to that exchange between the control unit 14D and viewfinder 30 via the connector 14J. Also, the interface unit 14H supplies a status signal indicating the operation status of the imaging apparatus 10 output from the control unit 14D to the viewfinder 30 via the connector 14J.

Examples of the above-mentioned status signal include a status signal indicating whether or not the current status is a recording status, a status signal warning when the imaging apparatus 10 is driven by battery, that the remaining battery power thereof has fallen below a predetermined value.

The operating unit 14E is made up of switches, a knob, and so forth which are operated to perform various settings relating to the operation of the imaging apparatus 10. The display unit 14F is made up of a display, LED lamps, and so forth for displaying the operation status of the imaging apparatus 10.

The control unit 14D manages control of the above-mentioned signal processing unit 14C, interface unit 14H, operating unit 14E, display unit 14F, and recording/playback unit 14G. Specifically, the control unit 14D is made up of a microcomputer including a CPU, RAM providing a working area, ROM storing a control program and so forth, a peripheral LSI for exchanging a control signal or a data signal with the signal processing unit 14C, interface unit 14H, operating unit 14E, and display unit 14F, and executes various types of control operations by the CPU executing the control program in the ROM.

The power supply unit 14I generates power based on the power supplied from an unshown external power source, and supplies the generated power to the imaging devices 14B, signal processing unit 14C, interface unit 14H, operating unit 14E, display unit 14F, and recording/playback unit 14G, thereby operating each unit thereof. Also, the power supplied from the power supply unit 14I is supplied to the viewfinder 30 via the connector 14J, thereby operating the viewfinder 30.

Note that with the present embodiment, a case wherein the recording/playback unit 14G is built in the camera body 14 has been described, but the recording/playback unit 14G may be provided outside of the camera body 14. In this case, what is necessary is to connect the recording/playback unit 14G and camera body 14 with cables, and to perform exchange of a picture signal and so forth via the cables.

Figure 20:
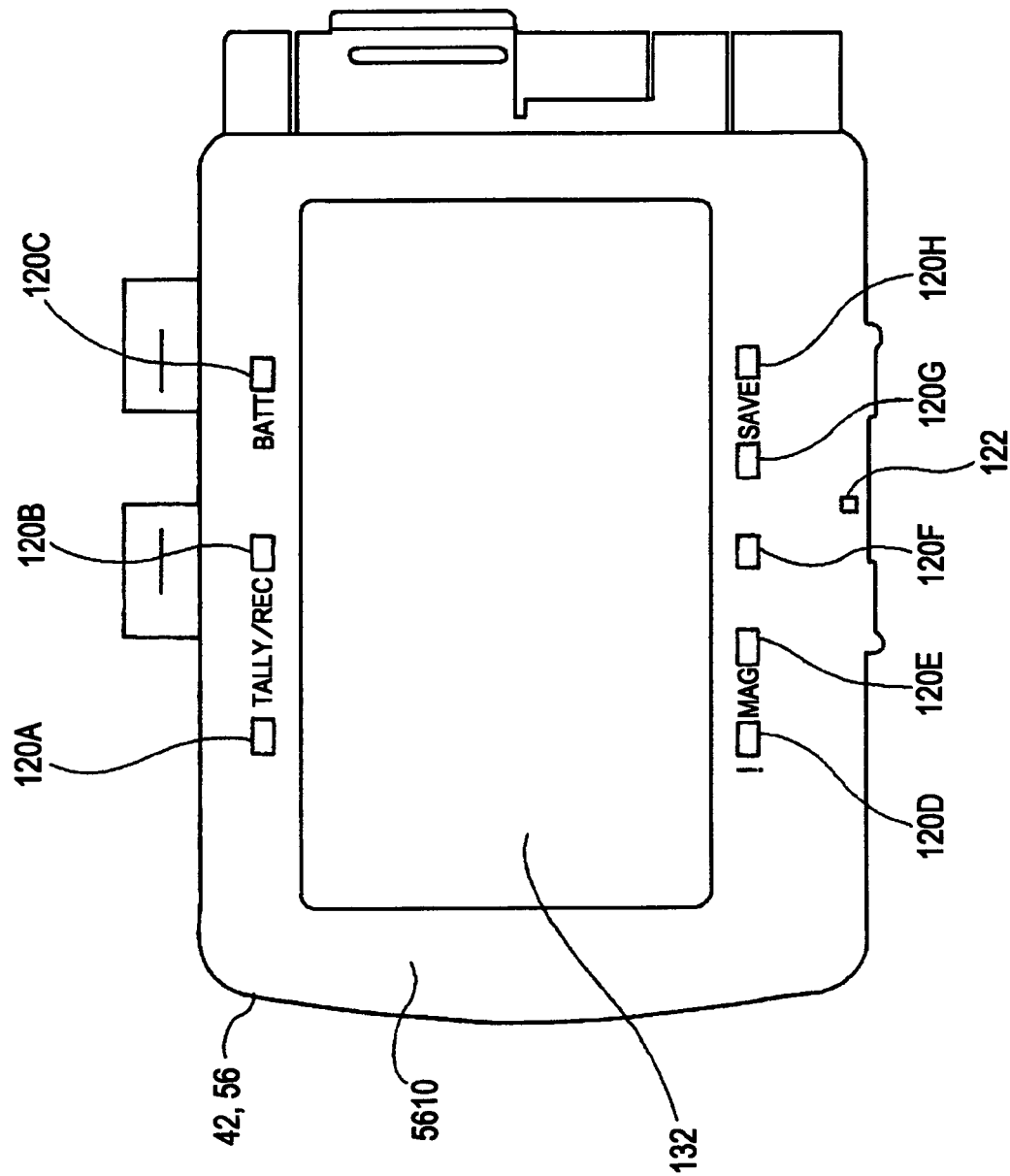
FIG. 20 is a front view of the display panel.

Next, description will be made regarding the control system of the viewfinder 30 which is a feature of the present invention. FIG. 19 is a block diagram illustrating the configuration of the control system of the viewfinder 30, and FIG. 20 is a front view of the display panel 42.

As shown in FIG. 19, the control system of the viewfinder 30 is configured so as to include a connector 101 to be connected to the connector 14J of the imaging apparatus, which is provided at the main unit 32, first through fourth boards B1, B2, B3, and B4 which are housed in the case 3202 of the main unit 32, and fifth through seventh boards B5, B6, and B7 which are housed in the case 56 of the display panel 42.

The first board B1 is provided with the above-mentioned pushbutton switches 3210C and power supply unit 102. The second board B2 is provided with the above-mentioned knobs 3210A and changeover switches 3210B. The third board B3 is provided with the CPU 104, EEPROM 106, buffer and low-pass filter (LPF) 108, and LED driver 110. The fourth board B4 is provided with the A/D unit 112, scaler unit 114, SDRAM 116, and first signal processing unit 118. The fifth board B5 is provided with first through third lamps 120A, 120B, and 120C. The sixth board B6 is provided with fourth through eighth lamps 120D, 120E, 120F, 120G, and 120H, and detecting unit 122. The seventh board B7 is provided with a second signal processing unit 124, control unit 126, backlight driving unit 128, backlight 130, and liquid crystal display device 132.

The power supply unit 102 regulates the power supplied from the imaging apparatus 10 via the connector 101, and supplies this to the third, fourth, and seventh boards B3, B4, and B7 as power voltage for operation.

The CPU 104 is operated by the control program stored in an unshown ROM or the like being executed, which controls the operations of the A/D unit 112, scaler unit 114, first signal processing unit 118, second signal processing unit 124, and so forth. Also, the CPU 104 performs various types of operations in response to operating input of the knobs 3210A, changeover switches 3210B, and pushbutton switches 3210C. These operations include the display operations and setting operations of a later-described setting menu screen.

Also, the CPU 104 controls the operation of the LED driver 110 based on a status signal indicating the operation status of the imaging apparatus 10 supplied from the imaging apparatus 10 via the connector 101 (e.g., a status signal indicating whether or not the current state is a recording sate, or a status signal warning the remaining amount of the battery), and the operation status of the display unit 31. Also, the CPU 104 controls the operation of the LED driver 110 based on the detection signal supplied from the detecting unit 122 as described later to adjust the brightness of the first through eighth lamps 120A through 120H, or controls the operation of the backlight driving unit 128 to adjust the brightness of a picture to be displayed on the display surface 3402 of the liquid crystal device 132.

The EEPROM 106 stores various types of data necessary for the operation of the CPU 104, e.g., later-described first and second brightness, and third and fourth brightness.

The buffer and low-pass filter (LPF) 108 accumulates the picture signals supplied from the camera body 14 of the imaging apparatus 10 via the connector 101, and provides the picture signals of a necessary frequency band to the A/D unit 112 at the subsequent stage.

The LED driver 110 supplies a drive current to the first through eighth lamps 120A through 120H, thereby turning on/off these lamps. Also, the LED driver 110 is configured so as to adjust the brightness of the first through eighth lamps 120A through 120H by increasing/decreasing the drive current based on the control signal supplied from the CPU 104. With the present embodiment, the LED driver 110 controls the drive current by PWM (Pulse Width Modulation) control.

The A/D unit 112 converts the picture signal supplied from the buffer and low-pass filter 108 from an analog signal to a digital signal. The scaler unit 114 subjects the picture signal which is a digital signal supplied from the A/D unit 112 to scaling (lowering resolution) in accordance with the number of pixels of the liquid crystal display device 132. The SDRAM 116 is employed when the scaler unit 114 subjects a picture signal to scaling. The first signal processing unit 118 subjects the picture signal supplied from the scaler unit 114 to existing known various types of signal processing, and supplies this to the second signal processing unit 124 at the subsequent stage.

Examples of such signal processing include peaking processing for enhancing and displaying the outline portion of a picture, and enlargement display processing for enlarging and displaying a part of a picture.

Also, the first signal processing unit 118 includes a function for performing the signal processing of a picture signal so as to laterally invert a picture to be displayed on the liquid crystal display device 132, i.e., picture reversal processing, and controls execution/non-execution of the picture reversal processing based on the control signal supplied from the CPU 104.

The second signal processing unit 124 subjects the picture signal supplied from the first signal processing unit 118 to optimization signal processing necessary for displaying a picture on the liquid crystal display device 132. With the present embodiment, the first and second signal processing units 118 and 124 are each made up of a PLD (Programmable Logic Device).

The control unit 126 generates a driving signal for driving the liquid crystal display device 132 based on the picture signal supplied from the second signal processing unit 126, and performs processing such as supplying the generated signal to the liquid crystal display device 132. The liquid crystal display device 132 displays a picture based on the above-mentioned driving signal, and with the present embodiment, displays a picture with brightness according to the light amount of the illumination light irradiated from the backlight 130 provided on the back face of the liquid crystal display device 132.

The backlight driving unit 128 turns on the backlight 130 by supplying a driving signal to the backlight 130, and is configured to adjust the brightness of illumination light of the backlight 130 based on the control signal supplied from the CPU 104, and thus adjust the brightness of a picture to be displayed on the display surface 3402.

As shown in FIG. 20, of the front face plate 5610 of the display panel 42, the side located at one of both sides in the direction orthogonal to the longitudinal direction is provided with the first through third lamps 120A through 120C with intervals along the above-mentioned longitudinal direction.

Also, of the front face plate 5610, the side located at the other of both sides in the direction orthogonal to the longitudinal direction is provided with the fourth through eighth lamps 120D through 120H with intervals along the above-mentioned longitudinal direction.

With the present embodiment, the first lamp 120A is a tally lamp which can be used by the cameraman assigning an arbitrary function thereto.

The second lamp 120B and sixth lamp 120F are tally lamps indicating that recording by the imaging apparatus 10 is being performed by turning on these lamps.

The third lamp 120C is a battery remaining quantity indicator for warning by turning on this lamp when the imaging apparatus 10 is driven by the battery, that the remaining amount of the battery thereof has fallen below a predetermined value.

The fourth, fifth, seventh, and eighth lamps 120D, 120E, 120G, and 120H are lamps for displaying whether or not to perform the above-mentioned peaking processing, the operation status of the display unit 31 including whether or not to perform enlargement display processing, and so forth.

That is to say, the first through eighth lamps 120A through 120H are lamps for displaying the operation status of the imaging apparatus 10 or display unit 31.

The detecting unit 122 detects the presence/absence of attachment of the eyepiece unit 36 to the display portion 34 (whether the current state is an attached state or a detached state), and supplies a detection signal S0 to the CPU 104.

As shown in FIG. 20, with the present embodiment, the detecting unit 122 is provided at the front face plate 5610 of the case 56 pressed by the frame portion 3612 of the eyepiece unit 36. A switch is employed as such a detecting unit 122 which is turned on when being pressed by the frame portion 3612, and is turned off when pressing is released. Note that as for such a detecting unit 122, existing known various types of switches, sensors, and so forth can be employed.

Accordingly, in a state in which the eyepiece unit 36 is attached to the display portion 34, the detection signal S0 in an ON state is supplied from the detecting unit 122 to the CPU 104, and in a state in which the eyepiece unit 36 is removed from the display portion 34, the detection signal S0 in an OFF state is supplied from the detecting unit 122 to the CPU 104.

With the present embodiment, a display control unit which realizes a feature of the present invention is made up of the power supply unit 102, CPU 104, EEPROM 106, buffer and low-pass filter (LPF) 108, A/D unit 112, scaler unit 114, SDRAM 116, first signal processing unit 118, second signal processing unit 124, control unit 126, backlight driving unit 128, and backlight 130. Also, with the present embodiment, a lamp control unit which realizes a feature of the present invention is made up of the CPU 104, EEPROM 106, and LED driver 110.

Next, description will be made regarding the brightness setting of the liquid crystal display device 132, and the brightness settings of the first through eighth lamps 120A through 120H.

As described above, with the viewfinder 30, there are two use modes of the case of attaching the eyepiece unit 36 to the display portion 34, and visually recognizing the display surface 3402 via the eyepiece unit 36, and the case of removing the eyepiece unit 36 from the display portion 34, and visually recognizing the display surface 3402 directly.

In the case of using the eyepiece unit 36, the cameraman can visually recognize the display surface 3402 and first through eighth lamps 120A through 120H without being influenced by external light under a shooting environment, whereby it is sufficient for visibility that the display surface 3402 and first through eighth lamps 120A through 120H have low brightness, and on the contrary, too high brightness causes the cameraman to sense glare and reduce visual recognition.

On the other hand, in the event of visually recognizing the display surface 3402 directly, external light under a shooting environment irradiates the display surface 3402 and first through eighth lamps 120A through 120H, and accordingly, in order to visually recognize the display surface 3402 and first through eighth lamps 120A through 120H clearly, it is necessary to increase the brightness of the display surface 3402 and first through eighth lamps 120A through 120H so as to handle the external light.

Therefore, with the present embodiment, an arrangement is made wherein both the brightness of a picture to be displayed on the display surface 3402 and the brightness of the first through eighth lamps 120A through 120H are changed (switched) so as to correspond to both an attached state and a detached state of the eyepiece unit 36 as to the display portion 34.

First, description will be made regarding operations for setting the brightness of a picture to be displayed on the display surface 3402, and the brightness of the first through eighth lamps 120A through 120H.

Figure 21:
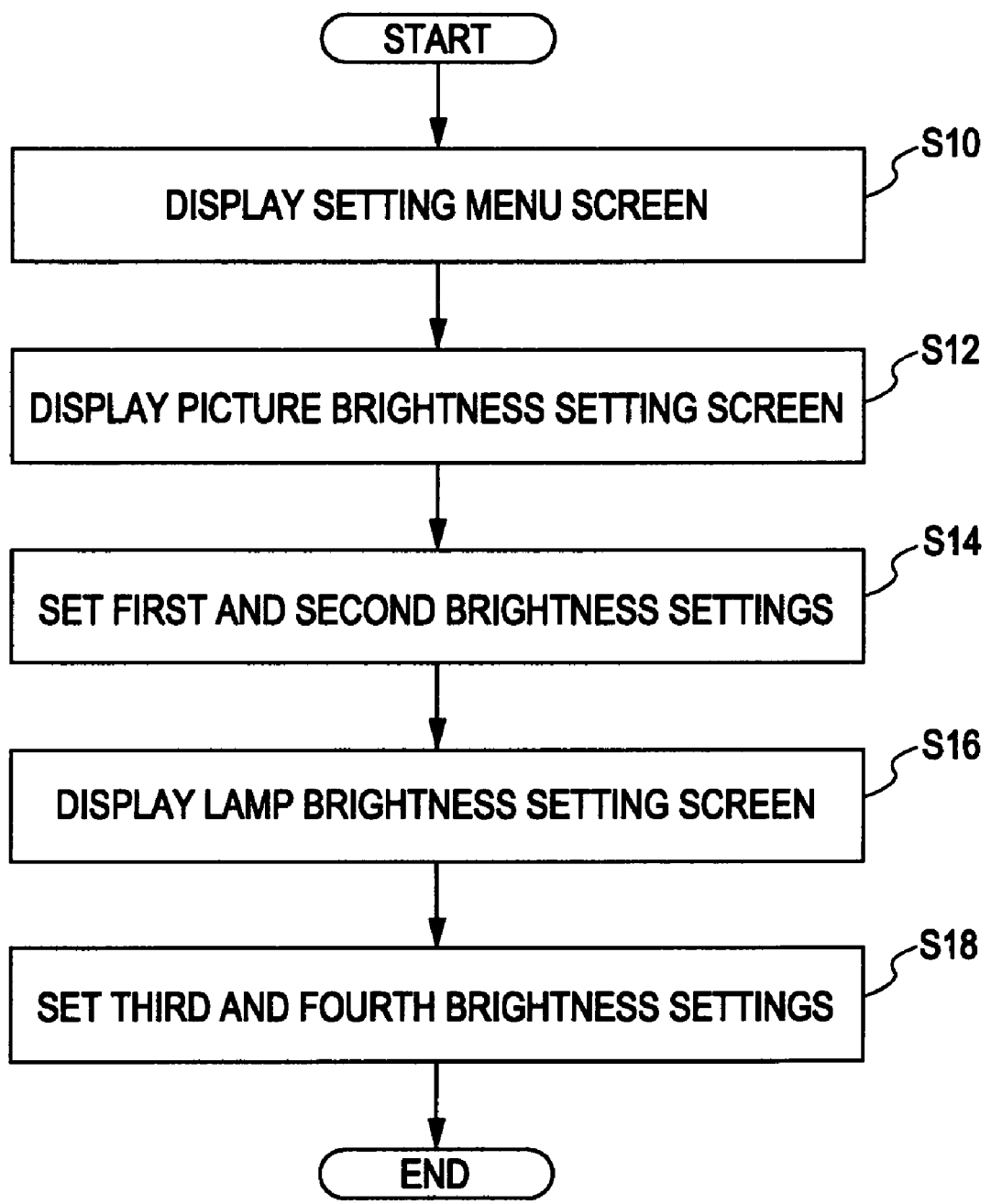
FIG. 21 is a flowchart describing the setting operation of the brightness of a picture and the brightness of first through eighth lamps through to be displayed on a display surface.

FIG. 21 is a flowchart for describing the operations for setting the brightness of a picture to be displayed on the display surface 3402, and the brightness of the first through eighth lamps 120A through 120H.

First, in response to one of the pushbutton switches 3210C of the main unit 32 being operated, the CPU 104 displays a setting menu screen on the display surface 3402 (step S10). This setting menu screen is for performing various settings of the viewfinder 30 including brightness setting.

Next, in response to one of the pushbutton switches 3210C of the main unit 32 being operated, the CPU 104 displays a picture brightness setting screen for setting the brightness of a picture to be displayed on the display surface 3402 (step S12).

With the picture brightness setting screen, for example, an arrangement is made wherein brightness can be set by increasing/decreasing a numeric value indicating the level of brightness by operating one of the pushbutton switches 3210C, and in accordance with the numeric value being increased/decreased, the CPU 104 controls the backlight driving unit 128 to increase/decrease the light amount of illumination light of the backlight 130.

Subsequently, the first brightness which is the brightness of a picture to be displayed on the display surface 3402, which is suitable for visually recognizing the display surface 3402 by looking into the eyepiece unit 36, and the second brightness which is the brightness of a picture to be displayed on the display surface 3402, which is suitable for visually recognizing the display surface 3402 directly by removing the eyepiece unit 36, are each set (step S14).

The second brightness at the time of visually recognizing the display surface 3402 is directly influenced by external light, so this value is higher than the value of the first brightness.

The set first brightness and the set second brightness are stored in the EEPROM 106 by the CPU 104.

Next, in response to one of the pushbutton switches 3210C of the main unit 32, the CPU 104 displays a lamp brightness setting screen for setting the brightness of the first through eighth lamps 120A through 120H (step S16).

With the lamp brightness setting screen also, in the same way as with the picture brightness setting screen, an arrangement is made wherein brightness can be set by increasing/decreasing a numeric value indicating the level of brightness by operating one of the pushbutton switches 3210C, and in accordance with the numeric value being increased/decreased, the CPU 104 controls the LED driver 110 to increase/decrease the light amount of the first through eighth lamps 120A through 120H.

Subsequently, the third brightness which is the brightness of the first through eighth lamps 120A through 120H, which is suitable for visually recognizing the first through eighth lamps 120A through 120H by looking into the eyepiece unit 36, and the fourth brightness which is the brightness of a picture to be displayed on the display surface 3402, which is suitable for visually recognizing the first through eighth lamps 120A through 120H directly by removing the eyepiece unit 36, are each set (step S18).

The fourth brightness at the time of visually recognizing each lamp is directly influenced by external light, so this value is higher than the value of the third brightness.

The set third brightness and the set fourth brightness are stored in the EEPROM 106 by the CPU 104. Thus, the settings of brightness are completed.

Note that such operations for setting brightness are not restricted to the operations employing the above-mentioned menu screen, so existing known various setting methods can be employed.

Figure 22:
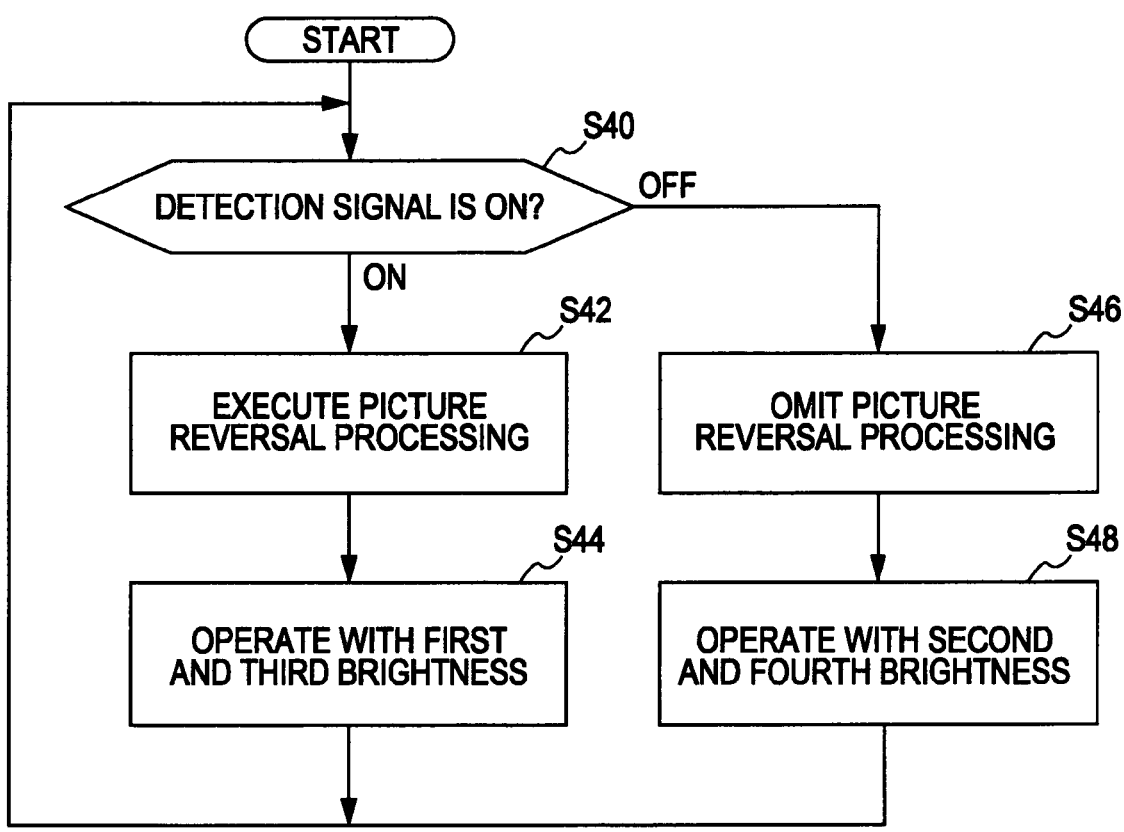
FIG. 22 is a flowchart of the adjustment operation of brightness.

Next, description will be made regarding brightness adjustment operation. FIG. 22 is a flowchart of brightness adjustment operation.

The CPU 104 monitors regarding whether the detection signal S0 from the detecting unit 122 is on or off (step S40).

In the event that the detection signal S0 is in an ON state, i.e., in the event that the eyepiece unit 36 is attached to the display portion 34, the CPU 104 supplies a control signal to the first signal processing unit 118 to execute the picture reversal processing (step S42), controls the backlight driving unit 128 based on the first brightness stored in the EEPROM 106, and controls the LED driver 110 based on the third brightness stored in the EEPROM 106, thereby operating by taking the brightness of a picture to be displayed on the display surface 3402 as the first brightness, and taking the brightness of the first through eighth lamps 120A through 120H as the third brightness (step S44). Then, the flow returns to step S40.

In the event that the detection signal S0 is in an OFF state, i.e., in the event that the eyepiece unit 36 is not attached to the display portion 34, the CPU 104 supplies a control signal to the first signal processing unit 118 not to execute the picture reversal processing (step S42), controls the backlight driving unit 128 based on the second brightness stored in the EEPROM 106, and controls the LED driver 110 based on the fourth brightness stored in the EEPROM 106, thereby operating by taking the brightness of a picture to be displayed on the display surface 3402 as the second brightness, and taking the brightness of the first through eighth lamps 120A through 120H as the fourth brightness (step S44). Then, the flow returns to step S40.

As described above, according to the present embodiment, an arrangement is made wherein a picture to be displayed on the display surface 3402 is laterally inverted, and also the brightness of a picture to be displayed on the display surface 3402, and the brightness of the respective lamps 120A through 120H are changed based on the detection by the detecting unit 122.

Accordingly, it goes without saying that a cameraman can visually recognize a picture of which the relation of the left and right positions is correct without performing particular operations in each case of the case of visually recognizing the display surface 3402 via the eyepiece unit 36, and the case of visually recognizing the display surface 3402 directly via no eyepiece unit 36, i.e., in each state of an attached state of the eyepiece unit 36, and a detached state of the eyepiece unit 36, and further the cameraman can visually recognize a picture having suitable brightness corresponding to the presence/absence of the eyepiece unit 36, which is advantageous to realizing improvement in operability, and also improving the visual recognition of a picture and the visual recognition of the lamps.

Also, like the imaging apparatus 10 and viewfinder 30 according to the present embodiment, in the event that the display panel 42 is set to a standing state, and in a state in which the camera body 14 is carried on the shoulder, the cameraman is allowed to visually recognize the display surface 3402 and the lamps 120A through 120H directly, there is a possibility that the display surface 3402 and the lamps 120A through 120H may be influenced by external light, so that the cameraman cannot readily visually recognize the display surface 3402 and the lamps 120A through 120H, but according to the present embodiment, even in the event of shooting by visually recognizing the display surface 3402 directly, the picture can be displayed with suitable brightness, and also each lamp can be displayed with suitable brightness only by removing the eyepiece unit 36 from the display unit 31, which is advantageous to realizing improvement in operability, and also improving the visual recognition of a picture and the visual recognition of the lamps.

Note that with the present embodiment, description has been made regarding the case in which both of the brightness of a picture and the brightness of each lamp are changed based on the detection by the detecting unit 122, but an arrangement may be made wherein only the brightness of a picture is changed based on the detection by the detecting unit 122. Note however, like the present embodiment, changing both of the brightness of a picture and the brightness of each lamp is advantageous to not only improvement in visual recognition but also improvement in ease of use by a cameraman.

Note that with the present embodiment, description has been made regarding the viewfinder 30 to be detachably attached to the camera body 14 of the imaging apparatus 10, but the main unit 32 of the viewfinder 30 may be provided integrally with the camera body 14, and it goes without saying that the present invention can be applied to such a viewfinder 30 and imaging apparatus 10 as well.

It should be further noted that a primary feature of the present invention relates to a viewfinder as such, which is not restricted to belonging exclusively to a video camera or a still photography camera, and accordingly language such as "shooting" and "cameraman" should not be construed as indicating that the invention is in some way restricted to the viewfinder of a video camera, and likewise the absence of language such as "photography" should not be construed as indicating that a viewfinder of a still camera is not included in the scope of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. A viewfinder, comprising:
    a display unit including a display surface on which a picture is displayed based on a picture signal supplied from an imaging apparatus; and
    an eyepiece unit, which is detachably attached to said display unit, configured to enlarge a picture displayed on said display surface to make the picture visually recognizable;
    said display unit including:
        a display control unit configured to display said picture on said display surface based on said picture signal, and
        a detecting unit configured to detect the presence/absence of attachment of said eyepiece unit; and
    wherein said display control unit is configured to laterally invert a picture to be displayed on said display surface based on the detection of said detecting unit, and to change the brightness of a picture to be displayed on said display surface,
    when the detecting unit detects presence of attachment of said eyepiece unit, the brightness of the picture to be displayed on said display surface is a first brightness preset by a user of the viewfinder, and when the detecting unit detects absence of attachment of said eyepiece unit, the brightness of the picture to be displayed on said display surface is a second brightness preset by a user of the viewfinder,
    the first and second brightness levels are preset by the user by operating a pushbutton switch of the display unit to display on the display surface a setting menu screen for performing various settings of the viewfinder including a brightness setting, operating a pushbutton switch of the display unit to display on the display surface a picture brightness setting screen, and operating a pushbutton switch of the display unit to increase/decrease a numeric value indicating the level of brightness, and the first and second brightness levels are used without automatic modification, and
    the display unit is configured such that the display surface pivots between a first position at which the display surface is viewed when the eyepiece unit is attached to the display unit and a second position at which the display surface is viewed when the eyepiece unit is not attached to the display unit.

2. The viewfinder according to claim 1, wherein said display unit further comprises:
    a lamp configured to display the operation state of said imaging apparatus or said display unit, and
    a lamp control unit configured to drive said lamp based on said operation state;
    said eyepiece unit enlarges the display of said lamp together with said picture to make both visually recognizable;
    and said lamp control unit is configured to change the brightness of said lamp based on the detection by said detecting unit.

3. The viewfinder according to claim 2, wherein said display unit further comprises:
    a display panel;
    said display panel includes a front surface including said display surface;
    said front surface includes a front plate in which an opening is formed;
    and said display surface is provided to locate in the inside of said opening;
    and said lamp is provided on said front plate.

4. The viewfinder according to claim 2, wherein, in accordance with change in the brightness of said lamp by said display control unit, the brightness of said lamp is set to a third brightness when the presence of attachment of said eyepiece unit is detected, and to a fourth brightness having a higher value than said third brightness when the absence of attachment of said eyepiece unit is detected.

5. The viewfinder according to claim 1, wherein said display unit comprises:
    a main unit detachably attached to a camera body of said imaging apparatus; and
    a display portion on which a picture image-captured at said camera body side is displayed;
    said display portion includes
        a supporting member which is connected to said main unit so as to rotate,
        a display panel including said display surface, and
        a connecting mechanism configured to connect said supporting member and said display panel to swing between a laid state in which said display panel is laid on said supporting member and a standing state in which said display panel stands from said supporting member.

6. The viewfinder according to claim 1, wherein said display unit comprises:
 a main unit which is detachably attached to a camera body of said imaging apparatus; and
 a display portion on which a picture image-captured at said camera body side is displayed;
 said display portion includes
  a supporting member which is connected to said main unit to rotate,
  a display panel including said display surface, and
  a connecting mechanism configured to connect said supporting member and said display panel to swing between a laid state in which said display panel is laid on said supporting member and a standing state in which said display panel stands from said supporting member;
 and said supporting member is connected to said main unit to rotate on an imaginary axis extending in the horizontal direction of said camera body in a state in which said main unit is attached to said camera body;
 and said display surface is turned to the lateral direction of said camera body in said laid state, and is turned backward in said standing state.

7. The viewfinder according to claim 1, wherein said display unit comprises:
 a main unit which is provided integrally to a camera body of said imaging apparatus; and
 a display portion on which a picture image-captured at said camera body side is displayed;
 said display portion includes
  a supporting member which is connected to said main unit to rotate,
  a display panel including said display surface, and
  a connecting mechanism configured to connect said supporting member and said display panel to swing between a laid state in which said display panel is laid on said supporting member and a standing state in which said display panel stands from said supporting member;
 and said supporting member is connected to said main unit to rotate on an imaginary axis extending in the horizontal direction of said camera body;
 and said display surface is turned to the lateral direction of said camera body in said laid state, and is turned backward in said standing state.

8. A control method for a viewfinder including a display unit that includes (a) a display surface on which a picture is displayed based on picture signals supplied from an imaging apparatus and (b) a display control unit configured to display said picture on said display surface, and an eyepiece unit detachably attached to said display unit and configured to enlarge a picture displayed on said display surface to make the picture visually recognizable, said control method comprising:
 detecting the presence or absence of attachment of said eyepiece unit; and
 laterally inverting a picture to be displayed on said display surface based on said detection, and changing the brightness of a picture to be displayed on said display surface,
 when presence of attachment of said eyepiece unit is detected in the detecting step, the brightness of the picture to be displayed on said display surface is a first brightness preset by a user of the viewfinder, and when absence of attachment of said eyepiece unit is detected in the detecting step, the brightness of the picture to be displayed on said display surface is a second brightness preset by a user of the viewfinder,
 the first and second brightness levels are preset by the user by operating a pushbutton switch of the display unit to display on the display surface a setting menu screen for performing various settings of the viewfinder including a brightness setting, operating a pushbutton switch of the display unit to display on the display surface a picture brightness setting screen, and operating a pushbutton switch of the display unit to increase/decrease a numeric value indicating the level of brightness, and the first and second brightness levels are used without automatic modification, and
 adjusting the display unit such that the display surface pivots between a first position at which the display surface is viewed when the eyepiece unit is attached to the display unit and a second position at which the display surface is viewed when the eyepiece unit is not attached to the display unit.

9. An imaging apparatus, comprising:
 a camera body configured to image a picture; and
 a viewfinder provided on said camera body;
 wherein said viewfinder includes
  a display unit including a display surface on which a picture is displayed based on a picture signal supplied from said camera body, and
  an eyepiece unit which is detachably attached to said display unit and configured to enlarge a picture displayed on said display surface to make the picture visually recognizable;
 said display unit includes
  a display control unit configured to display said picture on said display surface based on said picture signal, and
  a detecting unit configured to detect the presence/absence of attachment of said eyepiece unit;
 said display control unit is configured to laterally invert a picture to be displayed on said display surface based on the detection of said detecting unit, and to change the brightness of a picture to be displayed on said display surface,
 when the detecting unit detects presence of attachment of said eyepiece unit, the brightness of the picture to be displayed on said display surface is a first brightness preset by a user of the viewfinder, and when the detecting unit detects absence of attachment of said eyepiece unit, the brightness of the picture to be displayed on said display surface is a second brightness preset by a user of the viewfinder,
 the first and second brightness levels are preset by the user by operating a pushbutton switch of the display unit to display on the display surface a setting menu screen for performing various settings of the viewfinder including a brightness setting, operating a pushbutton switch of the display unit to display on the display surface a picture brightness setting screen, and operating a pushbutton switch of the display unit to increase/decrease a numeric value indicating the level of brightness, and the first and second brightness levels are used without automatic modification, and
 the display unit is configured such that the display surface pivots between a first position at which the display surface is viewed when the eyepiece unit is attached to the display unit and a second position at which the display surface is viewed when the eyepiece unit is not attached to the display unit.

* * * * *